United States Patent
Ono

(10) Patent No.: US 10,671,053 B2
(45) Date of Patent: Jun. 2, 2020

(54) NUMERICAL CONTROLLER AND MACHINE TOOL SYSTEM

(71) Applicant: FANUC CORPORATION, Minamitsuru-gun, Yamanashi (JP)

(72) Inventor: Takenori Ono, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 73 days.

(21) Appl. No.: 15/880,895

(22) Filed: Jan. 26, 2018

(65) Prior Publication Data

US 2018/0246498 A1 Aug. 30, 2018

(30) Foreign Application Priority Data

Feb. 28, 2017 (JP) ................. 2017-036405

(51) Int. Cl.
*G05B 19/4155* (2006.01)
*G05B 19/418* (2006.01)

(52) U.S. Cl.
CPC ..... *G05B 19/4155* (2013.01); *G05B 19/4187* (2013.01); *G05B 19/41865* (2013.01);
(Continued)

(58) Field of Classification Search
CPC .................................................. G05B 19/4155
(Continued)

(56) References Cited

U.S. PATENT DOCUMENTS

2004/0236462 A1 11/2004 Takeshita et al.
2015/0134100 A1* 5/2015 Iuchi .................. G05B 19/4155
700/159
(Continued)

FOREIGN PATENT DOCUMENTS

CN 1562563 1/2005
CN 101088654 12/2007
(Continued)

OTHER PUBLICATIONS

Office Action dated Sep. 5, 2019 in DE Patent Application No. 10 2018 201 758. 1 (related German National Stage Application) plus Machine Translation, courtesy of Google Machine Translation services. (Year: 2019).*
(Continued)

*Primary Examiner* — Mohammad Ali
*Assistant Examiner* — Joshua T Sanders
(74) *Attorney, Agent, or Firm* — Wenderoth, Lind & Ponack, L.L.P.

(57) ABSTRACT

A numerical controller (100) capable of shortening the cycle time during tool replacement without modifying an existing program is provided. A numerical controller (100) includes a block information checking unit (108) that analyzes a program for respective blocks. When it is determined that one or two or more feed axis positioning commands are present before a tool replacement command found in the analysis result of the program, the block information checking unit (108) modifies the analysis result of the program so that a rotating tool axis orientation operation in the tool replacement command is executed during execution of a feed axis positioning command in any one of the one or two or more feed axis positioning command blocks.

10 Claims, 21 Drawing Sheets

(52) U.S. Cl.
CPC ............ *G05B 2219/32257* (2013.01); *G05B 2219/34418* (2013.01); *G05B 2219/36364* (2013.01); *G05B 2219/36507* (2013.01)

(58) Field of Classification Search
USPC ........................................................ 700/159
See application file for complete search history.

(56) References Cited

U.S. PATENT DOCUMENTS

2016/0054727 A1* 2/2016 Kageyama ......... G05B 19/4103
700/188
2017/0003673 A1* 1/2017 Souma ............... G05B 19/4155

FOREIGN PATENT DOCUMENTS

| CN | 101715572 | 5/2010 |
|---|---|---|
| CN | 105278450 | 1/2016 |
| CN | 105388848 | 3/2016 |
| DE | 603 20 164 | 5/2009 |
| DE | 10 2013 015 236 | 3/2014 |
| DE | 10 2015 010 654 | 2/2016 |
| JP | 61-20104 | 1/1986 |
| JP | 64-25208 | 1/1989 |
| JP | 11-48072 | 2/1999 |
| JP | 2003-58212 | 2/2003 |
| JP | 2004-1229 | 1/2004 |
| JP | 2010-69545 | 4/2010 |
| JP | 2012-141762 | 7/2012 |
| JP | 2016-45937 | 4/2016 |
| JP | 2017-16323 | 1/2017 |
| WO | 2013/171850 | 11/2013 |

OTHER PUBLICATIONS

Notification of Reasons for Refusal dated Sep. 18, 2018 in corresponding Japanese Patent Application No. 2017-036405.
Office Action dated May 23, 2019 in CN Patent Application No. 201810162130.3 with Machine translation.
Office Action dated Sep. 5, 2019 in DE Patent Application No. 10 2018 201 758.1.

* cited by examiner

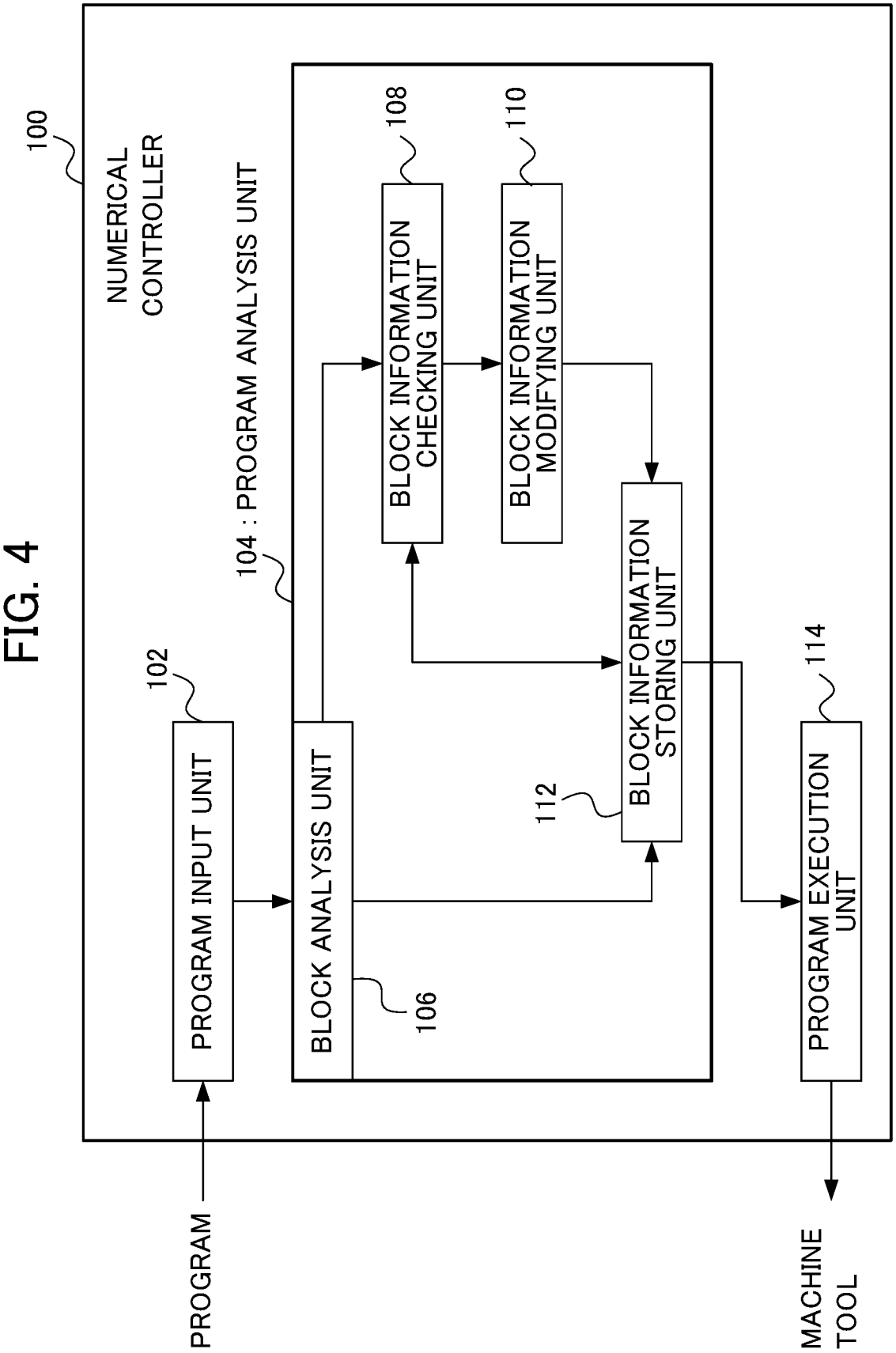

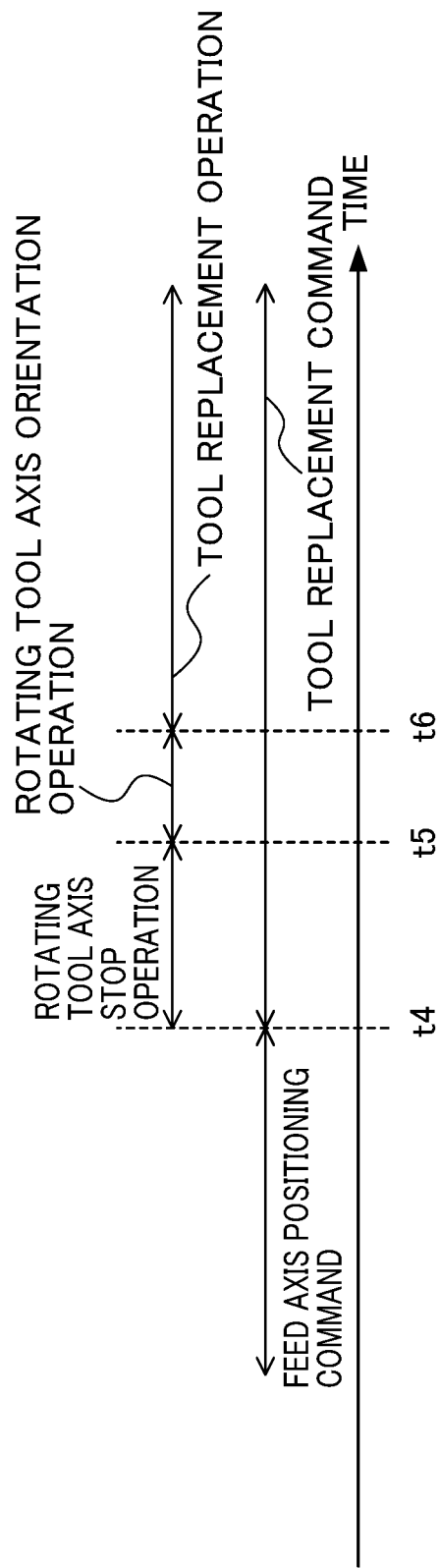

NUMERICAL CONTROLLER AND MACHINE TOOL SYSTEM

This application is based on and claims the benefit of priority from Japanese Patent Application No. 2017-036405, filed on 28 Feb. 2017, the content of which is incorporated herein by reference.

BACKGROUND OF THE INVENTION

Field of the Invention

The present invention relates to a controller that controls machine tools in a machining center or the like. Particularly, the present invention relates to a numerical controller that controls machine tools on the basis of a program that describes operations of machine tools. Moreover, the present invention relates to a machine tool system including a numerical controller.

Related Art

Conventionally, replacement of a rotating tool used in a machining center or the like is executed in the following manner. First, FIG. 10 illustrates examples of commands of a conventional machining program that performs tool replacement. As illustrated in FIG. 10, when a tool is replaced, first, a rotating tool axis rotation stop command (M05) is executed. Subsequently to this command, a feed axis positioning command (G00) including positioning to a tool replacement position is executed, and then, a tool replacement command (M06) is executed. Moreover, during execution of the tool replacement command (M06), a rotating tool axis positioning operation (a rotating tool axis orientation) of rotating a rotating tool axis to a position at which the rotating tool can be replaced and a tool replacement operation are executed. Due to this, the rotating tool axis orientation is executed after execution of the tool replacement command starts, and then, the tool replacement operation starts.

Terms

In a machining center, a rotating tool axis is generally referred to as a main spindle. However, in a lathe machine tool, a main spindle generally means an axis that rotates a work which is a machining target. Therefore, in the present specification, in order to clearly indicate a rotating target, the term "rotating tool axis" is used instead of the term main spindle. Moreover, the "rotating tool axis" includes a rotating tool axis in a combined machine tool such as a combined lathe machine tool. In the following description, "rotating tool axis rotation stop" will be simply referred to as "rotating tool axis stop". FIG. 11 illustrates an example of a conceptual diagram illustrating an aspect of machining in a combined lathe in which a main spindle is an axis that rotates a work and which includes a rotating tool axis separately from the main spindle. As illustrated in FIG. 11, in an example of a combined lathe, for example, a machining process is performed in such a way that a work 2 is rotated by a main spindle 4, a turning tool 6 machines the work 2, and a rotating tool 8 attached to a rotating tool axis 12 machines the work 2.

Rotating Tool Axis Orientation

FIGS. 12A to 12D illustrate a relation between a rotating tool axis and a tool holder of a rotating tool. FIG. 12A illustrates an explanatory diagram of a rotating tool holder (a tooling 10), and FIG. 12B illustrates an explanatory diagram of the rotating tool axis 12. FIG. 12C illustrates a view when the tooling 10 is seen from a direction A parallel to the axis of the tooling 10. FIG. 12D illustrates a view when the rotating tool axis 12 is seen from a direction B parallel to the axis of the rotating tool axis 12.

The rotating tool attached to the rotating tool axis 12 in such a way that a tapered portion 10a (see FIG. 12A) of the tooling 10 (tool holder) for holding the rotating tool is inserted and fitted into a tapered portion 12a (see FIG. 12B) of the rotating tool axis 12 and a key 12b (see FIG. 12D) of the rotating tool axis 12 engages with a key groove 10b (see FIG. 12C) of the tooling. In this manner, since the key 12b of the rotating tool axis 12 engages with the key groove 10b of the tooling 10, the rotating tool can be rotated with rotation of the rotating tool axis 12.

During replacement of a rotating tool, an operation of detaching the rotating tool attached to the rotating tool axis 12 in the above-described manner using a grip and attaching the next tool is executed. FIG. 13 illustrates an aspect of a grip 14 during tool replacement. As illustrated in FIG. 13, a key 14a is also provided in the grip 14, and it is necessary to dispose the key 14a so as to engage it with the key groove 10b of the tooling 10 during tool replacement. Moreover, during tool replacement, the key 12b of the rotating tool axis and the key groove 10b of the tooling are set to engage with each other. During rotating tool axis stop, it is basically unclear where the position of the key 12b stops. Therefore, when tool replacement is to be performed, it is necessary to position the rotating tool axis 12 so that the position of the key 12b (the key groove 10b) is always at a specific position in relation to the grip 14. A positioning operation of positioning the rotating tool axis 12 at a specific position is referred to as a rotating tool axis orientation.

FIGS. 14A, 14B, and 14C illustrate examples of conventionally typical program commands when tool replacement is performed. In FIGS. 14A, 14B, and 14C, respective commands in the program have the following meaning.

M05: Rotating tool axis stop command
G00Zzz: Feed axis positioning command including positioning to tool replacement position
(Z: Feed axis name, zz: Position or movement amount command)
M06Txx: Tool replacement command
(Txx Command for tool to be replaced, xx: Tool number)

In the example of FIG. 14A, after the rotating tool axis stop command (M05) is executed, feed axis positioning (including positioning to the tool replacement position) is performed (G00Zzz), and the tool replacement command (M06Txx) is executed. In this example, execution of the tool replacement command (M06Txx) includes a rotating tool axis orientation and tool replacement operation. FIGS. 15A and 15B illustrate execution timings of respective commands in the example illustrated in FIG. 14A. FIG. 15A is a conceptual diagram illustrating the meaning of respective commands of the example of the program illustrated in FIG. 14A. FIG. 15B is a timing chart in which the horizontal axis represents time. First, the rotating tool axis stop command (M05) is executed until time point t1. Subsequently, a feed axis positioning command (G00Zzz) is executed in a period between time points t1 and t2. The tool replacement command (M06Txx) starts at time point t2. As illustrated in FIG. 15B, in the tool replacement command (M06Txx), first, a rotating tool axis orientation operation is executed, and subsequently, a tool replacement operation is executed at time point t3.

In the example of FIG. 14B, a feed axis positioning (including positioning to a tool replacement position) (G00Zzz) is performed, and a tool replacement command (M06Txx) is executed. In this example, during execution of the tool replacement command (M06Txx), a rotating tool axis stop, a rotating tool axis orientation, and a tool replacement operation are executed. FIGS. 16A and 16B illustrate execution timings of respective commands of the example illustrated in FIG. 14B. FIG. 16A is a conceptual diagram illustrating the meaning of respective commands in the example of the program illustrated in FIG. 14B, FIG. 16B is a timing chart in which the horizontal axis represents time. First, a feed axis positioning command (G00Zzz) is executed until time point t4. Subsequently, the tool replacement command (M06Txx) is executed at time point t4. As illustrated, in FIG. 16B, in the tool replacement command (M06Txx), first, a rotating tool axis stop operation is executed at time point t4, an orientation is executed at time point t5, and subsequently, a tool replacement operation is executed at t6.

In the example of FIG. 14C, the feed axis positioning (including positioning to the tool replacement position) (G00Zzz) and the rotating tool axis stop command (M05) are executed, and the tool replacement command (M06Txx) is executed. In this example, during execution of the tool replacement command (M06Txx), the rotating tool axis orientation and the tool replacement operation are executed. FIGS. 17A and 17B illustrate execution timings of respective commands of the example illustrated in FIG. 14C. FIG. 17A is a conceptual diagram illustrating the meaning of respective commands in the example of the program illustrated in FIG. 14C. FIG. 17B is a time chart in which the horizontal axis represents time. First, at time point T7, a feed axis positioning command (G00Zzz) and a rotating tool axis stop command (M05) start. Although the rotating tool axis stop command ends earlier than the feed axis positioning operation, the feed axis positioning operation is continued up to time point t8 after the rotating tool axis stop command ends. The tool replacement command (M06Txx) is executed at time point t8. As illustrated in FIG. 17B, in the tool replacement command (M06Txx), first, the rotating tool axis orientation operation is executed, and subsequently, the tool replacement operation is executed at time point t9.

Patent Document 1 below discloses a NC machine tool in which it is determined whether a main spindle has arrived at a predetermined position and an orientation has been completed, and a rotating tool axis stop and an orientation are performed when the orientation has not been completed.

Patent Document 1: Japanese Unexamined Patent Application, Publication No. 2004-1229

SUMMARY OF THE INVENTION

In the conventional machine tool, since commands included in a program are executed sequentially, there is a problem that the cycle time increases. In the case of the program illustrated in FIG. 14B (FIG. 16A), since the rotating tool axis stop is performed before execution of the rotating tool axis orientation operation executed at the start of the tool replacement command, the execution time for the rotation stop is always necessary.

When the example of the program illustrated in FIG. 14A (FIG. 15A) or FIG. 14B (FIG. 16A) is modified so that M05 (the rotating tool axis stop command) is issued at the same time as the feed axis positioning command like the program illustrated in FIG. 14C (FIG. 17A), the cycle time required for the tool replacement can be shortened by a period required for stopping the rotating tool axis. However, such program modification needs to be performed individually for existing programs and such modification requires troublesome operations. Moreover, there is a concern that modification errors may occur during modification of programs. Furthermore, there may be a case in which modification of programs itself is not permitted depending on a use state of a program by users.

There is no problem even if the rotating tool axis orientation as well as the rotating tool axis stop are executed at any timing before tool replacement after the end of cutting. Therefore, the present inventor thought that the cycle time can be shortened further by adjusting the timings of these processes.

On the other hand, there is a concern that if the program itself is modified like the program illustrated in FIG. 14C (FIG. 17A), as described above, the process of modifying existing programs may be complex and an unexpected error may occur due to modification. Therefore, at is desirable to realize a system that shortens the cycle time required for the rotating tool axis stop and the rotating tool axis orientation during tool replacement by adjusting the processing timings as described above without modifying the program illustrated in FIG. 14A (FIG. 15A) or FIG. 14B (FIG. 16A) like the program illustrated in FIG. 14C (FIG. 17A). Moreover, it is also desirable to shorten the cycle time further with respect to the program illustrated in FIG. 14C (FIG. 17A).

In the technology disclosed in Patent Document 1, it is not possible to perform the rotating tool axis stop and the positioning operation at the same time when the rotating tool axis stop command is present before a command to move to a predetermined position.

In view of the above-described problem, an object of the present invention is to provide a numerical controller capable of shortening the cycle time during tool replacement.

The present inventor has completed the present invention by finding a possibility that the cycle time can be shortened by adjusting the execution timings of the respective processes during tool replacement and establishing a specific method. The solving principles of the present invention will be described below.

Solving Principle 1

Solving Principle 1 for solving the problem is to shorten the time for a rotating tool axis orientation operation without modifying a program. Specifically, a program command is looked ahead so that a rotating tool axis orientation operation starts during execution of a feed axis positioning command block. By such a process, since the rotating tool axis orientation operation can be executed earlier than execution of the tool replacement command without modifying the program command, it is possible to shorten the cycle time. Solving Principle 1 can be applied to all cases of FIGS. 14A, 14B, and 14C.

In the present specification, an operation group based on respective commands that form a program will be referred to as a block. For example, execution of a positioning command block means execution of an operation group (block) represented by a positioning command. FIG. 1 illustrates a timing chart illustrating an operation of Solving Principle 1. FIG. 1 is a timing chart in which the horizontal axis represents time and illustrates timings at which respective processes are executed. As illustrated in FIG. 1, when a rotating tool axis stop command is executed and the rotating tool axis stop command ends at time point t10, execution of a feed axis positioning command starts at the same time point t10.

Similarly to the conventional technology, although the tool replacement command is executed at time point t11, according to Solving Principle 1, execution of the rotating tool axis orientation operation included in the tool replacement command starts at time point t10 (that is, at the same timing as the timing at which the execution of the feed axis positioning command starts).

By such a process, the rotating tool axis orientation operation which was conventionally executed during the tool replacement command and of which the execution started at t11 which is the starting time point of execution of the tool replacement command can be executed at an earlier time point. As a result, it is possible to shorten the execution time of the tool replacement command that starts at time point t11 and therefore to shorten the cycle time. As illustrated in FIG. 1, the execution time of the tool replacement command which conventionally started from t11 and ended at t13 can be shortened by an amount corresponding to the rotating tool axis orientation operation, and the tool replacement command can be ended at time point t12.

Solving Principle 2

Solving Principle 2 for solving the problem is to shorten an execution time of the rotating tool axis stop command without modifying the program. Specifically, a program command is looked ahead so that the rotating tool stop command is executed at the same time as the positioning command (for positioning to the tool replacement position) before execution of the tool replacement command is executed. In this way, it is possible to shorten the execution time of a rotating tool axis stop command block or the stop time of the rotating tool axis without modifying the program command and to shorten the cycle time during tool replacement. FIGS. 2A, 2B, 3A, and 3B illustrate examples of time charts illustrating the operation of Solving Principle 2.

Example 1 of Solving Principle 2

FIGS. 2A and 2B illustrate operations when Solving Principle 2 is applied to the program command illustrated in FIG. 14A. FIG. 2A illustrates the program command illustrated in FIG. 14A, and FIG. 2B illustrates a timing chart illustrating execution timings of respective commands when Solving Principle 2 is applied to the program command of FIG. 14A.

In the program command illustrated in FIG. 2A, the rotating tool axis stop command (M05), the feed axis positioning command (G00Zzz), and the tool replacement command (M06Txx) are executed successively, for example, in the conventional technology. In contrast, according to Solving Principle 2, as illustrated in FIG. 2B, execution of the rotating tool axis stop command block starts at time point t14 simultaneously with the feed axis positioning command executed subsequently thereto. As a result, it is possible to shorten the execution time of the rotating tool axis stop command substantially and to shorten the cycle time. Execution of the feed axis positioning command is completed at time point t15, and the execution of the tool replacement command starts at the same time point t15.

Example 2 of Solving Principle 2

FIGS. 3A and 3B illustrate operations when Solving Principle 2 is applied to the program command illustrated in FIG. 14B. FIG. 3A illustrates the program command illustrated in FIG. 14B, and FIG. 3B illustrates a timing chart illustrating execution timings of respective commands when the program command illustrated in FIG. 14B is applied to Solving Principle 2 in the program command illustrated in FIG. 3A, the feed axis positioning command (G00Zzz) and the tool replacement command (M06Txx) are executed successively, for example, in the conventional technology. The tool replacement command includes a rotating tool axis stop command, and both commands are executed simultaneously.

In contrast, according to Solving Principle 2, as illustrated in FIG. 3B, execution of a rotating tool axis stop operation in the tool replacement command starts at time point t16 simultaneously with execution of a feed axis positioning command that precedes the rotating tool axis stop operation. As a result, it is possible to shorten the execution time of the rotating tool axis stop command substantially and to shorten the cycle time. The execution of the feed axis positioning command is completed at time point t17, and execution of the tool replacement command starts at the same time point t17. The operation time of the tool replacement command can be shortened by an amount corresponding to the execution time for the rotating tool axis stop, and therefore, the cycle time can be shortened.

The present invention is an invention based on Solving Principles 1 and 2 and employs the following means.

(1) A numerical controller (for example, a numerical controller 100 to be described later) according to the present invention includes: a program input unit (for example, a program input unit 102 to be described later that inputs a program that describes operations of a machine tool; a program analysis unit (for example, a program analysis unit 104 to be described later) that analyzes the input program and outputs an analysis result; and a program execution unit (for example, a program execution unit 114 to be described later) that controls the machine tool on the basis of the analysis result obtained by the program analysis unit, the program analysis unit including: a block analysis unit (for example, a block analysis unit 106 to be described later) that analyzes blocks of commands in the program to obtain an analysis result and stores the analysis result in a block information storing unit; the block information storing unit (for example, a block information storing unit 112 to be described later) that stores the analysis result; a block information checking unit (for example, a block information checking unit 108 to be described later) that checks the analysis result obtained by the block analysis unit and instructs a block information modifying unit to modify the analysis result for the command block when a predetermined condition is satisfied; and the block information modifying unit (for example, a block information modifying unit 110 to be described later) that modifies the analysis result stored in the block information storing unit on the basis of the instruction of the block information checking unit, wherein when it is determined that one or two or more feed axis positioning commands are present before a tool replacement command found in the analysis result, the block information checking unit instructs the block information modifying unit to modify the analysis result stored in the block information storing unit so that a rotating tool axis orientation operation in the found tool replacement command is executed during execution of the feed axis positioning command in any one of the one or two or more feed axis positioning command blocks.

(2) In the numerical controller according to (1), when it is determined that one or two or more feed axis positioning commands are present before the tool replacement command found in the analysis result, the block information checking unit may instruct the block information modifying unit to modify the analysis result stored in the block information storing unit so that a rotating tool axis orientation operation in the found tool replacement command is executed during execution of the first feed axis positioning command in the one or two or more feed axis positioning command blocks.

(3) In the numerical controller according to (1) or (2), when it is determined that one or two or more feed axis positioning commands are present before the tool replacement command found in the analysis result, the block information checking unit may instruct the block information modifying unit to remove a rotating tool axis orientation operation in the found tool replacement command from operations in the tool replacement command.

(4) A numerical controller according to the present invention includes: a program input unit that inputs a program that describes operations of a machine tool; a program analysis unit that analyzes the input program and outputs an analysis result; and a program execution unit that controls the machine tool on the basis of the analysis result obtained by the program analysis unit, the program analysis unit including: a block analysis unit that analyzes blocks of commands in the program to obtain an analysis result and stores the analysis result in a block information storing unit; the block information storing unit that stores the analysis result; a block information checking unit that checks the analysis result obtained by the block analysis unit and instructs a block information modifying unit to modify the analysis result for the command block when a predetermined condition is satisfied; and the block information modifying unit that modifies the analysis result stored in the block information storing unit on the basis of the instruction of the block information checking unit, wherein when it is determined that one or two or more feed axis positioning commands are present before a tool replacement command found in the analysis result, and a rotating tool axis stop command is present before the one or two or more feed axis positioning commands, the block information checking unit instructs the block information modifying unit to modify the analysis result stored in the block information storing unit so that the rotating tool axis stop command operation is executed during execution of the feed axis positioning command in any one of the one or two or more feed axis positioning command blocks.

(5) In the numerical controller according to (4), when it is determined that one or two or more feed axis positioning commands are present before the tool replacement command found in the analysis result, and a rotating tool axis stop command is present before the one or two or more feed axis positioning commands, the block information checking unit may instruct the block information modifying unit to modify the analysis result stored in the block information storing unit so that the rotating tool axis stop command operation is executed during execution of the first feed axis positioning command in the one or two or more feed axis positioning command blocks.

(6) In the numerical controller according to (4) or (5), when it is determined that one or two or more feed axis positioning commands are present before the tool replacement command found in the analysis result, and a rotating tool axis stop command is present before the one or two or more feed axis positioning commands, the block information checking unit may instruct the block information modifying unit to remove the analysis result of the rotating tool axis stop command present before the one or two or more feed axis positioning commands from the block information storing unit.

(7) A numerical controller according to the present invention includes: a program input unit that inputs a program that describes operations of a machine tool; a program analysis unit that analyzes the input program and outputs an analysis result; and a program execution unit that controls the machine tool on the basis of the analysis result obtained by the program analysis unit, the program analysis unit including: a block analysis unit that analyzes blocks of commands in the program to obtain an analysis result and stores the analysis result in a block information storing unit; the block information storing unit that stores the analysis result; a block information checking unit that checks the analysis result obtained by the block analysis unit and instructs a block information modifying unit to modify the analysis result for the command block when a predetermined condition is satisfied; and the block information modifying unit that modifies the analysis result stored in the block information storing unit on the basis of the instruction of the block information checking unit, wherein when it is determined that one or two or more feed axis positioning commands are present before a tool replacement command found in the analysis result, and a rotating tool axis stop command is not present before the one or two or more feed axis positioning commands, the block information checking unit instructs the block information modifying unit to modify the analysis result stored in the block information storing unit so that a rotating tool axis stop operation in the tool replacement command is executed during execution of the feed axis positioning command in any one of the one or two or more feed axis positioning command blocks.

(8) In the numerical controller according to (7), when it is determined that one or two or more feed axis positioning commands are present before a tool replacement command found in the analysis result, and a rotating tool axis stop command is not present before the one or two or more feed axis positioning commands, the block information checking unit may instruct the block information modifying unit to modify the analysis result stored in the block information storing unit so that the rotating tool axis stop operation in the tool replacement command is executed during execution of the first feed axis positioning command in the one or two or more feed axis positioning command blocks.

(9) In the numerical controller according to (7) or (8), when it is determined that one or two or more feed axis positioning commands are present before a tool replacement command found in the analysis result, and a rotating tool axis stop command is not present before the one or two or more feed axis positioning commands, the block information checking unit may instruct the block information modifying unit to remove the rotating tool axis stop operation in the tool replacement command from operations in the tool replacement command.

(10) A numerical controller according to the present invention includes: a program input unit that inputs a program that describes operations of a machine tool; a program analysis unit that analyzes the input program and outputs an analysis result; and a program execution unit that controls the machine tool on the basis of the analysis result obtained by the program analysis unit, the program analysis unit including: a block analysis unit that analyzes blocks of commands in the program to obtain an analysis result and stores the analysis result in a block information storing unit; the block information storing unit that stores the analysis result; a block information checking unit that checks the analysis result obtained by the block analysis unit and instructs a block information modifying unit to modify the analysis result for the command block when a predetermined condition is satisfied; and the block information modifying unit that modifies the analysis result stored in the block information storing unit on the basis of the instruction of the block information checking unit, wherein when it is determined that two or more feed axis positioning commands are present before a tool replacement command found in the analysis result, and a rotating tool axis stop command is present in the same block as any one of the two or more feed axis positioning commands, the block information checking unit performs a first process of not outputting an instruction to modify the analysis result stored in the block information storing unit to the block information modifying unit in order to execute the rotating tool axis stop command operation in a block where the rotating tool axis stop command is present, or the block information checking unit performs a second process of instructing the block information modifying unit to modify the analysis result stored in the block information storing unit so that the rotating tool axis stop command operation is executed during execution of the other feed axis positioning command in the two or more feed axis positioning command blocks.

(11) In the numerical controller according to (10), when the block information checking unit executes the second process, the block information checking unit may instruct the block information modifying unit to remove the analysis result of the rotating tool axis stop command from a block of the block information storing unit where the rotating tool axis stop command is present.

(12) In the numerical controller according to (11), when it is determined that two or more feed axis positioning commands are present before a tool replacement command found in the analysis result, and a rotating tool axis stop command is present in the same block as the second or subsequent feed axis positioning command of the two or more feed axis positioning commands, the block information checking unit may instruct the block information modifying unit to modify the analysis result stored in the block information storing unit so that the rotating tool axis stop command operation is executed during execution of the first feed axis positioning command in the two or more feed axis positioning command blocks.

(13) In the numerical controller according to (12), the block information checking unit may instruct the block information modifying unit to remove the analysis result of the rotating tool axis stop command from the second or subsequent block of the block information storing unit where the rotating tool axis stop command is present.

(14) In the numerical controller according to (1), when it is determined that one or two or more feed axis positioning commands are present before a tool replacement command found in the analysis result, and a rotating tool axis stop command is present before the one or two or more feed axis positioning commands, the block information checking unit may instruct the block information modifying unit to modify the analysis result stored in the block information storing unit so that the rotating tool axis stop command operation is executed during execution of the feed axis positioning command in any one of the one or two or more feed axis positioning command blocks, and the block information checking unit may instruct the block information modifying unit to modify the analysis result stored in the block information storing unit so that the rotating tool axis orientation operation is executed subsequently to the rotating tool axis stop command operation.

(15) In the numerical controller according to (1), when it is determined that one or two or more feed axis positioning commands are present before a tool replacement command found in the analysis result, and a rotating tool axis stop command is not present before the one or two or more feed axis positioning commands, the block information checking unit may instruct the block information modifying unit to modify the analysis result stored in the block information storing unit so that a rotating tool axis stop operation in the tool replacement command is executed during execution of the feed axis positioning command in any one of the one or two or more feed axis positioning command blocks, and the block information checking unit may instruct the block information modifying unit to modify the analysis result stored in the block information storing unit so that the rotating tool axis orientation operation is executed subsequently to the rotating tool axis stop operation.

(16) A machine tool system according to the present invention includes the numerical controller according to any one of (1) to (15) and the machine tool controlled by the numerical controller.

According to the present invention, it is possible to provide a numerical controller capable of shortening the cycle time during tool replacement without modifying an existing program.

BRIEF DESCRIPTION OF THE DRAWINGS

FIG. 4 is a block diagram illustrating a configuration of a numerical controller of an embodiment of the present invention.

FIG. 16B is a timing chart illustrating execution timings of respective commands of the example of the program illustrated in FIG. 14B.

DETAILED DESCRIPTION OF THE INVENTION

Hereinafter, embodiments of the present invention will be described with reference to the drawings.

1. Device Configuration

In the present embodiment, a numerical controller for machine tools will be described. Although this numerical controller is a device annexed to a machine tool, the numerical controller may be accommodated in the same housing as the machine tool and may be configured as a separate body. As described above, a program that describes operations of a machine tool is provided to this numerical controller. The numerical controller reads the program and controls the machine tool on the basis of the program.

FIG. 4 illustrates a block diagram of a configuration of the numerical controller according to the present embodiment. As illustrated in FIG. 4, a numerical controller 100 includes a program input unit 102, a program analysis unit 104, and a program execution unit 114. For example, other elements that form the numerical controller such as a command generation unit for generating commands for a servo motor are not illustrated. The numerical controller 100 may preferably be configured mainly as a computer. The numerical controller 100 is ideally configured by including a predetermined interface for inputting a program and a user's operations and an interface for outputting instructions to a machine tool. It is possible to form a machine tool system using the numerical controller 100 and a machine tool illustrated in FIG. 4. The machine tool system corresponds to an ideal example of a machine tool system described in the claims.

Figure 14A:
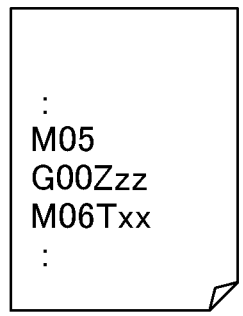
FIG. 14A is a diagram illustrating examples of general program commands when tool replacement is performed.

The program input unit 102 is an interface for inputting a program that describes operations of a machine tool and is an interface capable of inputting the program described in FIG. 14A and the like from the outside. For example, when a program is input via a predetermined network, a network interface is ideal as the program input unit 102. When a program is input from an external storage device, an IC card reader, a USB interface, or the like may be ideally used as the program input unit 102. In addition to these examples, any interface capable of inputting a program may be used. The program analysis unit 104 analyzes the input program and causes the program execution unit 114 to execute a predetermined execution process according to the content of the program. The program analysis unit 104 is ideally configured of computer software that describes the flow of analysis and a CPU (a CPU of a computer that forms the numerical controller 100) that executes the computer software.

The program execution unit 114 is a unit that outputs instructions to the machine tool on the basis of the analysis results obtained by the program analysis unit 104. For example, the program execution unit 114 is a unit that outputs instructions to a servo motor of the machine tool. As illustrated in FIG. 4, the program analysis unit 104 includes a block analysis unit 106, a block information checking unit 108, a block information modifying unit 110, and a block information storing unit 112. For example, these respective units are ideally realized by computer software that describes these functions and a CPU that executes these functions. Operations of the respective units of the program analysis unit 104 will be described in detail in the following description of operations.

2. Description of Operations

Embodiment 1 (Application. Example of Solving Means 1)

Figure 5:
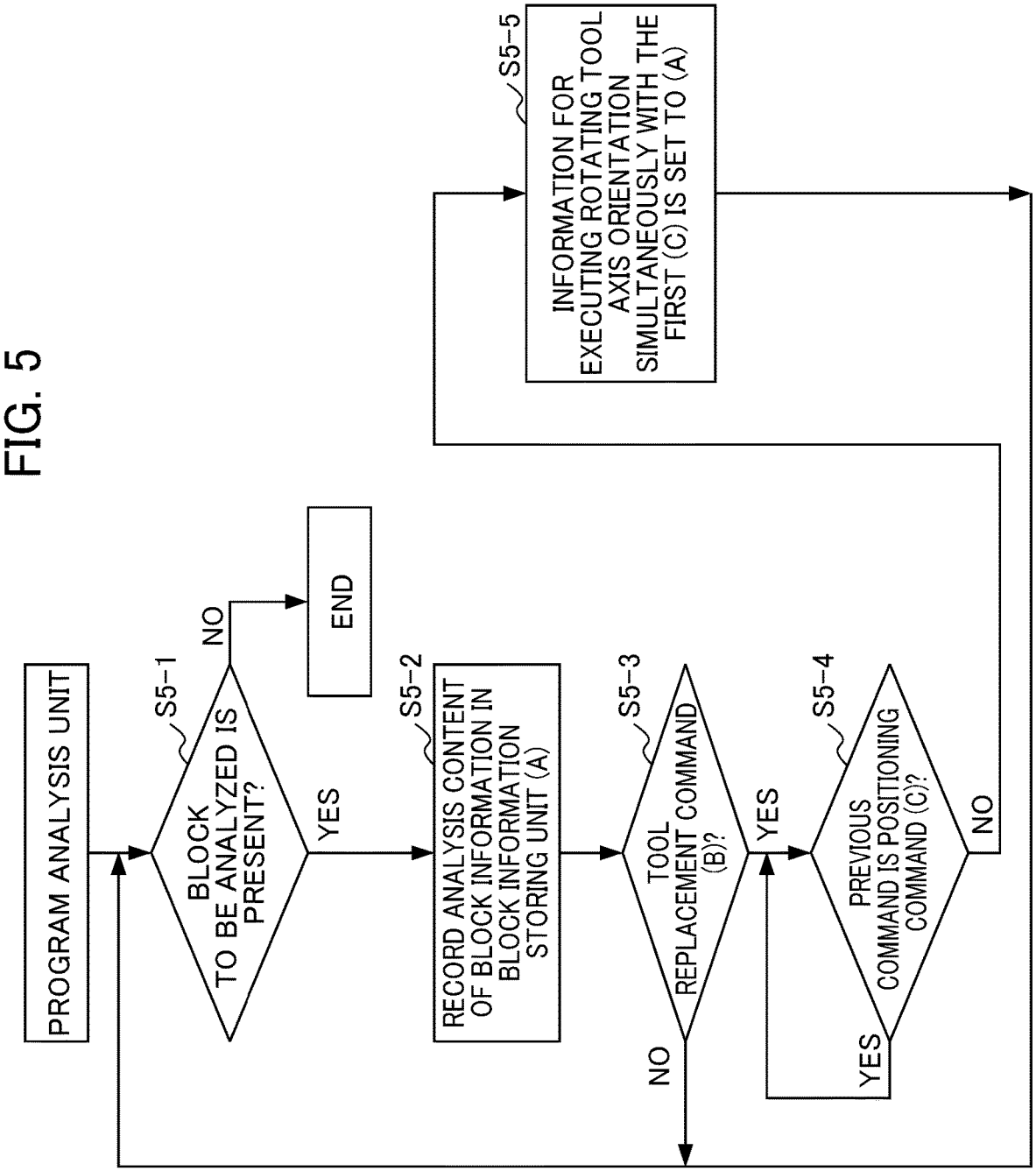
FIG. 5 is a flowchart illustrating operations when Solving Principle 1 is applied to Embodiment 1 of the present invention.

An operation example when Solving Principle 1 of reducing the time of a rotating tool axis orientation is applied will be described. In Embodiment 1, as described above, a program provided from the outside is input to the program input unit 102 and is transmitted to the program analysis unit 104. Subsequently, the program analysis unit 104 of the numerical controller 100 executes a program analysis process according to the following flow. This flow is illustrated in the flowchart of FIG. 5.

First, in step S5-1, the block analysis unit 106 checks whether block information included in a program which is an analysis target is present. The analysis process ends when the block information is not present. The flow proceeds to step S5-2 when an analysis target block is present. In step S5-2, the block analysis unit 106 analyzes block information which is an analysis target and records the analysis results in the block information storing unit 110. The block analysis unit 106 may be configured as a computer software and a CPU that sequentially analyze command blocks in a program. Moreover, the block information storing unit 110 may be configured as a predetermined storage means. Any means may be used as long as the means can store information. In the flowchart of FIG. 5, the block information storing unit 112 is abbreviated as (A) for the sake of convenience. The analysis results obtained by the block analysis unit 106 are transmitted simultaneously to the block information checking unit 108.

In step S5-3, the block information checking unit 108 determines whether the analyzed block is a tool replacement command block. When the analyzed block is not the tool replacement command (block), the flow proceeds to step S5-1 so that analysis of the next block is continued. On the other hand, when the analyzed block is the tool replacement command (block), the flow proceeds to step S5-4. In the flowchart of FIG. 5, the tool replacement command is abbreviated as (B) for the sake of convenience.

In step S5-4, the block information checking unit 108 determines whether a feed axis positioning command (block) is present before the found tool replacement command (block). For this determination, the block information checking unit 108 extracts the previous command from the block information storing unit 112 and makes a determination. When it is determined that the feed axis positioning command (block) is present, the process of step S5-4 is continued and it is determined whether the positioning command is present in a block of one block before, of the previous block. This process is continued as long as the feed axis positioning command continues in a block of one block before, of the previous block. For example, as illustrated in FIG. 8B to be described later, when a plurality of feed axis positioning commands are present, this process is continued until the first feed axis positioning command. In the flowchart of FIG. 5, the feed axis positioning command is abbreviated as (C) for the sake of convenience. On the other hand, when it is determined in step S5-4 that the block of one block before, of the previous block is not the feed axis positioning command (C), the flow proceeds to step S5-5.

In step S5-5, the block information checking unit 108 sets information for executing the rotating tool axis orientation together with the positioning operation as the analysis content of the feed axis positioning command (block). Specifically, in step S5-5, the block information modifying unit 110 rewrites the information in the block information storing unit 112 to the above content in response to an instruction from the block information checking unit (or adds the content to the information). Furthermore, in step S5-5, a content that the rotating tool axis orientation operation is not to be set as the analysis content of a block of present interest (that is, the tool replacement command block which is a present analysis target). Specifically, in step S5-5, the block information modifying unit 110 removes the rotating tool axis orientation operation from the analysis information (in the block information storing unit 112) of the tool replacement command block which is a block of present interest in response to an instruction from the block information checking unit to rewrite the analysis information to a content that only the tool replacement operation is to be executed (or delete the information of the rotating tool axis orientation operation).

By the above-described operations, it is possible to appropriately rewrite the analyzed content of the command on the basis of a row of commands in a provided program. The program execution unit 114 outputs commands for respective operations to the machine tool on the basis of the rewritten analysis content. As a result, since the program analysis unit 104 rearranges the analysis on the basis of a row of commands without modifying the provided existing program itself, it is possible to modify operations based on Solving Principle 1. Therefore, it is possible to shorten the cycle time during tool replacement without modifying an existing program.

Embodiment 2-1 (First Application Example of Solving Means 2)

Figure 2A:
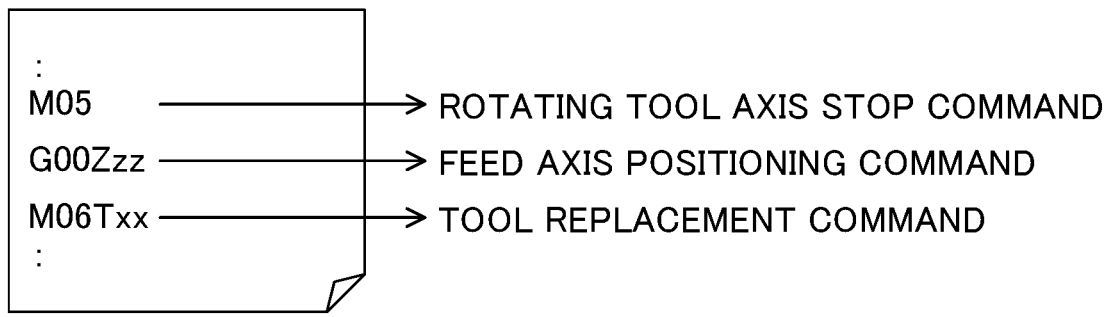
FIG. 2A illustrates an example of a program related to description of operations of Solving Principle 2 of the present invention.
Figure 2B:
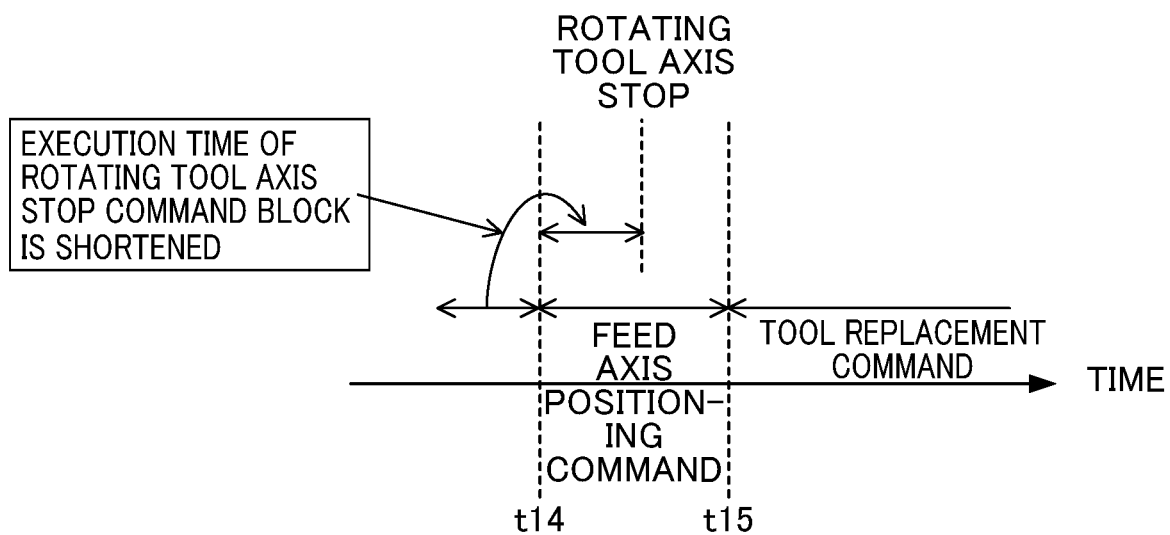
FIG. 2B is a timing chart illustrating operations of Solving Principle 2 of the present invention.
Figure 6:
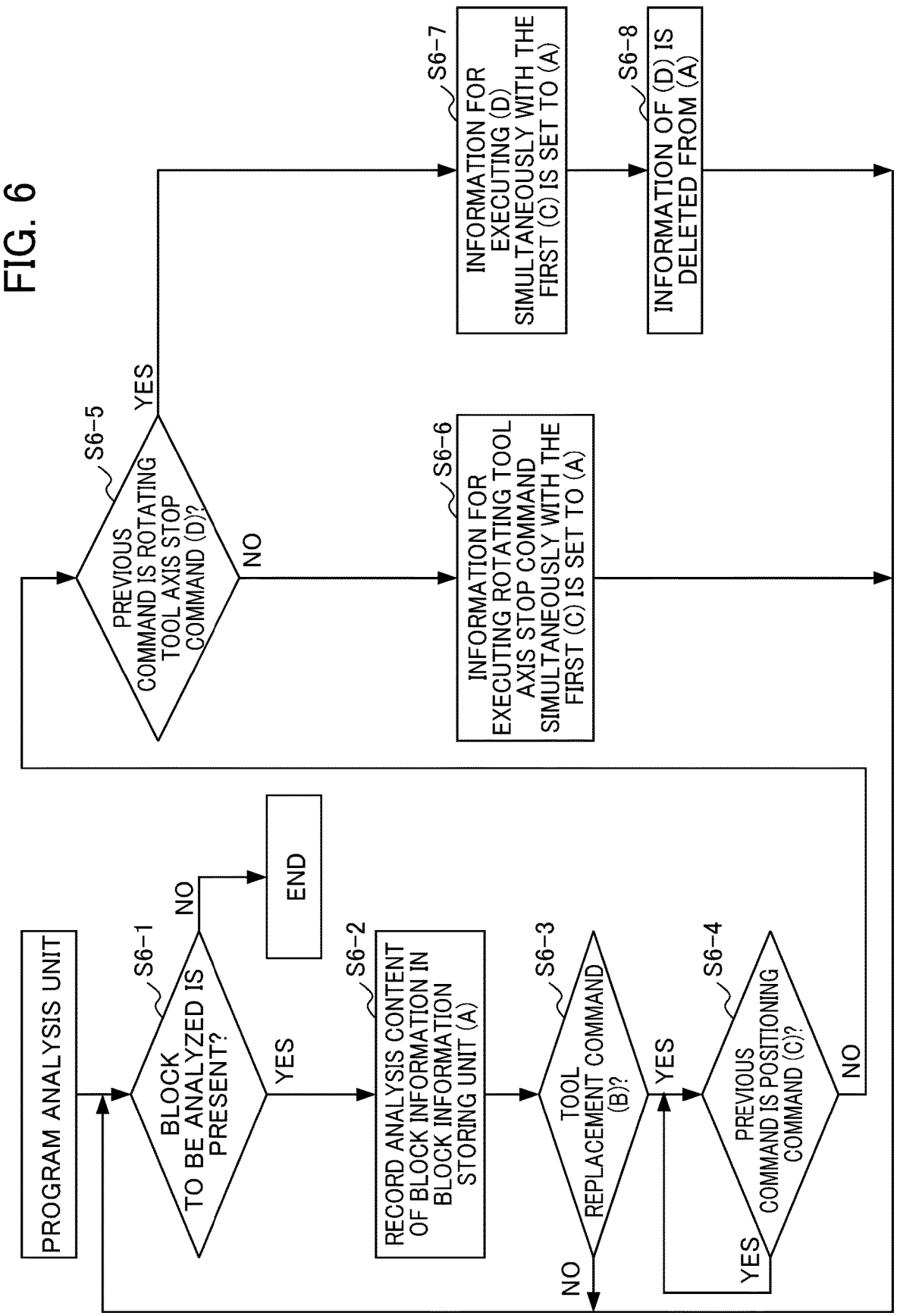
FIG. 6 is a flowchart illustrating operations when Solving Principle 2 is applied to Embodiment 2 of the present invention.

A first operation example when Solving Principle 2 of reducing the time of a rotating tool axis stop is applied will be described. In this operation example, as illustrated in FIGS. 2A and 2B, an operation when a rotating tool axis stop command is present before a feed axis positioning command will be mainly described. In Embodiment 2-1, as described above, a program provided from the outside is input to the program input unit 102 and is transmitted to the program analysis unit 104. Subsequently, the program analysis unit 104 of the numerical controller 100 executes a program analysis process according to the following flow. This flow is illustrated in the flowchart of FIG. 6.

First, in step S6-1, the block analysis unit 106 checks whether block information included in a program which is an analysis target is present. The analysis process ends when the block information is not present. The flow proceeds to step S6-2 when an analysis target block is present. In step S6-2, the block analysis unit 106 analyzes block information which is an analysis target and records the analysis results in the block information storing unit 110. The block analysis unit 106 may be configured as a computer software and a CPU that sequentially analyze command blocks in a program. Moreover, the block information storing unit 110 may be configured as a predetermined storage means. Any means may be used as long as the means can store information. In the flowchart of FIG. 5, the block information storing unit 112 is abbreviated as (A) for the sake of convenience similarly to FIG. 5. The analysis results obtained by the block analysis unit 106 are transmitted simultaneously to the block information checking unit 108.

In step S6-3, the block information checking unit 108 determines whether the analyzed block is a tool replacement command block. When the analyzed block is not the tool replacement command (block), the flow proceeds to step S6-1 so that analysis of the next block is continued. On the other hand, when the analyzed block is the tool replacement command (block), the flow proceeds to step S6-4. In the flowchart of FIG. 6, the tool replacement command is abbreviated as (B) for the sake of convenience similarly to FIG. 5.

In step S6-4, the block information checking unit 108 determines whether a feed axis positioning command (block) is present before the found tool replacement command (block), For this determination, the block information checking unit 108 extracts the previous command from the block information storing unit 112 and makes a determination. When it is determined that the feed axis positioning command (block) is present, the process of step S6-4 is continued and it is determined whether the positioning command is present in a block of one block before, of the previous block. This process is continued as long as the feed axis positioning command continues in a block of one block before, of the previous block. For example, as illustrated in FIG. 8B to be described later, when a plurality of feed axis positioning commands are present, this process is continued until the first feed axis positioning command which is the starting command. In the flowchart of FIG. 5, the feed axis positioning command is abbreviated as (C) for the sake of convenience. On the other hand, when it is determined in step S6-4 that the block of one block before, of the previous block is not the feed axis positioning command (C), the flow proceeds to step S6-5.

Figure 3A:
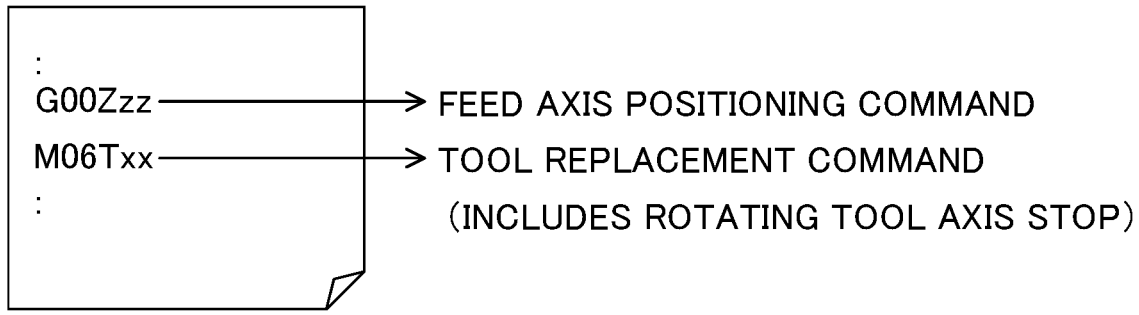
FIG. 3A illustrates an example of a program related to description of operations of Solving Principle 2 of the present invention.
Figure 3B:
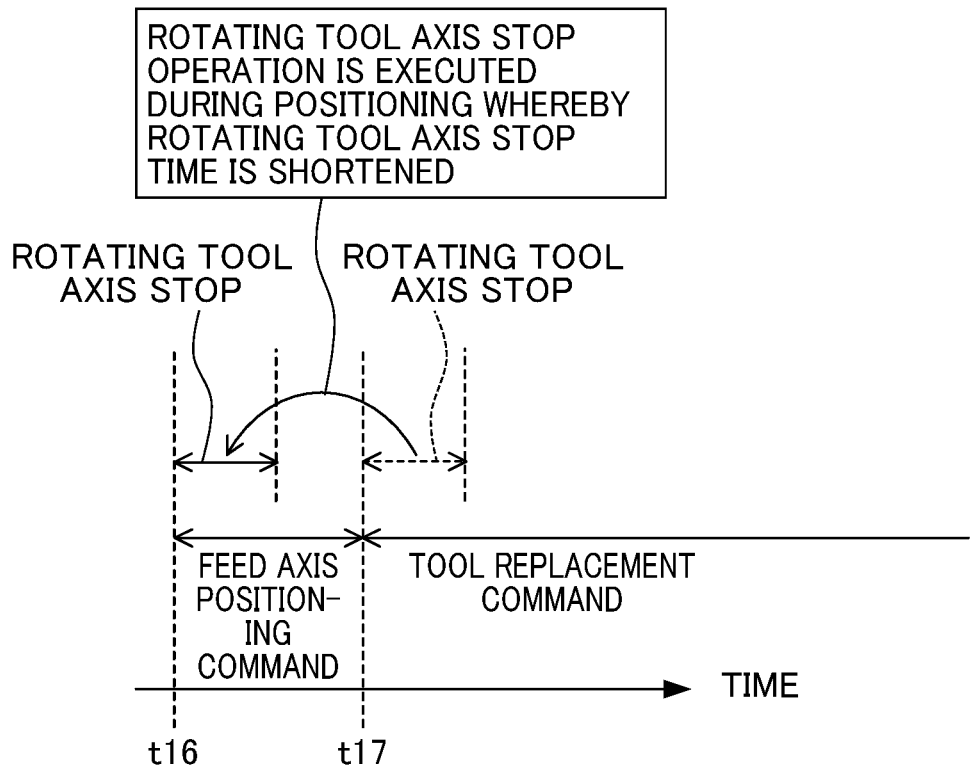
FIG. 3B is a timing chart illustrating operations of Solving Principle 2 of the present invention.

In step S6-5, the block information checking unit 108 determines whether a command of one block before, of the tool replacement command is the rotating tool axis stop command (block). The determination is performed by referring to the content of the block information storing unit 112. The flow proceeds to step S6-7 when it is determined that the previous block is the rotating tool axis stop command (block). On the other hand, the flow proceeds to step S6-6 when the rotating tool axis stop command (block) is not present in the previous block. A case in which the flow proceeds to step S6-6 is a case in which the rotating tool axis stop command (D) is not present before the feed axis positioning command (unlike FIGS. 2A and 2B) as illustrated in FIGS. 3A and 3B. The operation corresponding to this case will be described in Embodiment 2-2 for the sake of convenience. In the flowchart of FIG. 6, the rotating tool axis stop command (block) is abbreviated as (D). A case in which the previous block is the rotating tool axis stop command (D) is a case in which the rotating tool axis stop command (D) is present before one or two or more feed axis positioning commands. In this case, the flow proceeds to step S6-7. For example, an example of a case in which there is one feed axis positioning command is illustrated in FIGS. 2A and 2B.

In step S6-7, the block information checking unit 108 sets information for executing the rotating tool axis stop operation together with the positioning operation as the analysis content of the feed axis positioning command (block). Specifically, in step S6-7, the block information modifying unit 110 rewrites the information in the block information storing unit 112 to the above content in response to an instruction from the block information checking unit 108 (or adds the content to the information). In this way, as described with reference to FIG. 2B, the rotating tool axis stop operation can be executed simultaneously with the operation of the feed axis positioning command. When a plurality of feed axis positioning commands are present, the rotating tool axis stop operation is executed during the operation of the first feed axis positioning command.

In step S6-8, it is set such that the rotating tool axis stop command (D) found in step S6-5 is not executed. That is, the block information modifying unit 110 deletes the analysis content of the rotating tool axis stop command (D) (step S6-5) included in the original program command from the block information storing unit 112 (A) in response to an instruction from the block information checking unit 108.

By the above-described operations, it is possible to appropriately rewrite the analysis result on the basis of a row of commands in a provided program. The program execution unit 114 outputs commands for respective operations to the machine tool on the basis of the rewritten analysis content. As a result, since the program analysis unit 104 rearranges the analysis on the basis of a row of commands without modifying the provided existing program itself, it is possible to modify operations based on Solving Principle 2. Therefore, it is possible to shorten the cycle time during tool replacement without modifying an existing program.

Embodiment 2-2 (Second Application Example of Solving Means 2)

A second operation example when Solving Principle 2 of reducing the time of a rotating tool axis stop is applied will be described in this operation example, as illustrated in FIGS. 3A and 3B, an operation when a rotating tool axis stop command is not present before a feed axis positioning command and a rotating tool axis stop operation is included in a tool replacement command will be mainly described. In Embodiment 2-2, as described above, a program provided from the outside is input to the program input unit 102 and is transmitted to the program analysis unit 104. Subsequently, in the program analysis unit 104 of the numerical controller 100, the same processes as those described in Embodiment 2-1 are performed up to step S6-5 (see FIG. 6). In step S6-5, conversely to Embodiment 2-1, it is determined that the previous block is not the rotating tool axis stop command. As a result, the flow proceeds to step S6-6. Hereinafter, the processes subsequent to step S6-6 be described.

In step S6-6, the block information checking unit 108 sets information for executing the rotating tool axis stop operation together with the positioning operation as the analysis content of the feed axis positioning command (block). Specifically, in step S6-6, the block information modifying unit 110 rewrites the information in the block information storing unit 112 to the above content in response to an instruction from the block information checking unit 108 (or adds the content to the information). In this way, as described with reference to FIG. 3B, the rotating tool axis stop operation can be executed simultaneously with the operation of the feed axis positioning command. When one or two or more feed axis positioning commands are present, the rotating tool axis stop operation is executed during the operation of the first feed axis positioning command.

Furthermore, in step S6-6, a content that the rotating tool axis stop operation is not to be executed is set as the analysis content of a block of present interest (that is, the tool replacement command block which is a present analysis target). Specifically, in step S6-7, the block information modifying unit 110 removes the rotating tool axis stop operation from the analysis information (in the block information storing unit 112) of the tool replacement command block which is a block of present interest in response to an instruction from the block information checking unit to rewrite the analysis information to a content that only the tool replacement operation is to be executed (or delete the information of the rotating tool axis stop operation).

By the above-described operations, it is possible to appropriately rewrite the analyzed execution content of the command on the basis of a row of commands in a provided program. The program execution unit 114 outputs commands for respective operations to the machine tool on the basis of the rewritten analysis content. As a result, since the program analysis unit 104 rearranges the analysis on the basis of a row of commands without modifying the provided existing program itself, it is possible to modify operations based on Solving Principle 2. Therefore, it is possible to shorten the cycle time during tool replacement without modifying an existing program.

Case Where Rotating Tool Axis Stop is Present in the Middle

Although one or two or more feed axis positioning commands present successively are detected in step S6-4 of Embodiment 2-2, a case in which a rotating tool axis stop command is present in the same block as any one of the feed axis positioning commands may occur (for example, see FIG. 9B to be described later). In this case, in step S6-6, it is ideal to execute the operation of the rotating tool axis stop command during execution of the first feed axis positioning command of the detected one or two or more feed axis positioning commands (see FIG. 9B to be described later). In this case, specifically, in step S6-6, it is ideal for the block information modifying unit 110 to rewrite the information in the block information storing unit 112 to the content in response to an instruction from the block information checking unit so that the rotating tool axis stop operation is executed together with the operation of the first feed axis positioning command among one or two or more feed axis positioning commands (or add the content to the information). In step S6-6, it is ideal to remove the rotating tool axis stop command found among one or two or more feed axis positioning commands from the analysis information of the corresponding block in the block information storing unit 112.

Embodiment 3-1 (First Application Example of Solving Principle 1 and Solving Principle 2

Figure 7:
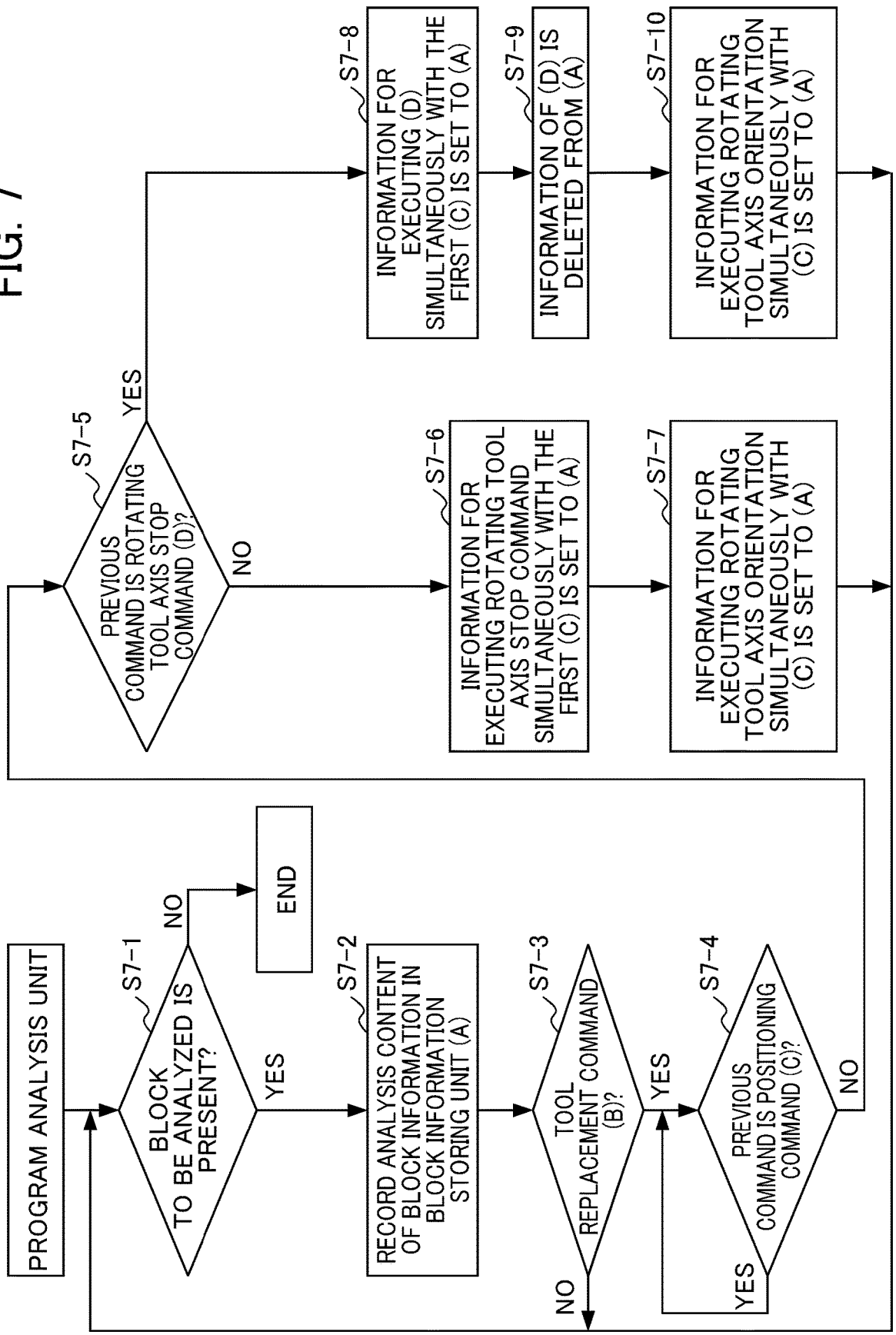
FIG. 7 is a flowchart illustrating operations when Solving Principles 1 and 2 are applied to Embodiment 3 of the present invention.

A first operation example when both Solving Principle 1 and Solving Principle 2 of reducing the time of a rotating tool axis stop are applied will be described. In this operation example, as illustrated in FIGS. 2A and 2B, an operation when a rotating tool axis stop command is present before a feed axis positioning command will be mainly described. In Embodiment 3-1, as described above, a program provided from the outside is input to the program input unit 102 and is transmitted to the program analysis unit 104. Subsequently, the program analysis unit 104 of the numerical controller 100 executes a program analysis process according to the following flow. This flow is illustrated in the flowchart of FIG. 7.

First, in step S7-1, the block analysis unit 106 checks whether block information included in a program which is an analysis target is present. The analysis process ends when the block information is not present. The flow proceeds to step S7-2 when an analysis target block is present. In step S7-2, the block analysis unit 106 analyzes block information which is an analysis target and records the analysis results in the block information storing unit 110. The block analysis unit 106 may be configured as a computer software and a CPU that sequentially analyze command blocks in a program. Moreover, the block information storing unit 110 may be configured as a predetermined storage means. Any means may be used as long as the means can store information. In the flowchart of FIG. 7, the block information storing unit 112 is abbreviated as (A) for the sake of convenience similarly to FIGS. 5 and 6. The analysis results obtained by the block analysis unit 106 are transmitted simultaneously to the block information checking unit 108.

In step S7-3, the block information checking unit 108 determines whether the analyzed block is a tool replacement command block. When the analyzed block is not the tool replacement command (block), the flow proceeds to step S7-1 so that analysis of the next block is continued. On the other hand, when the analyzed block is the tool replacement command (block), the flow proceeds to step S7-4. In the flowchart of FIG. 7, the tool replacement command is abbreviated as (B) for the sake of convenience similarly to FIGS. 5 and 6.

In step S7-4, the block information checking unit 108 determines whether a feed axis positioning command (block) is present before the found tool replacement command (block). For this determination, the block information checking unit 108 extracts the previous command from the block information storing unit 112 and makes a determination. When it is determined that the feed axis positioning command (block) is present, the process of step S7-4 is continued and it is determined whether the positioning command is present in a block of one block before, of the previous block. This process is continued as long as the feed axis positioning command continues in a block of one block before, of the previous block. For example, as illustrated in FIG. 8B to be described later, when a plurality of feed axis positioning commands are present, this process is continued until the first feed axis positioning command. In the flowchart of FIG. 7, the feed axis positioning command is abbreviated as (C) for the sake of convenience. On the other hand, when it is determined in step S7-4 that the block of one block before, of the previous block is not the feed axis positioning command (C), the flow proceeds to step S7-5.

In step S7-5, the block information checking unit 108 determines whether a command of one block before, of the tool replacement command is the rotating tool axis stop command (block). The determination is performed, referring to the content of the block information storing unit 112. The flow proceeds to step S6-7 when it is determined that the previous block is the rotating tool axis stop command (block).

On the other hand, the flow proceeds to step S7-6 when the rotating tool axis stop command (block) is not present in the previous block. A case in which the flow proceeds to step S7-6 is a case in which the rotating tool axis stop command (D) is not present before the feed axis positioning command (unlike FIGS. 2A and 2B) as illustrated in FIGS. 3A and 3B. The operation corresponding to this case will be described in Embodiment 3-2 for the sake of convenience. In the flowchart of FIG. 7, the rotating tool axis stop command (block) is abbreviated as (D).

A case in which the previous block is the rotating tool axis stop command (D) is a case in which the rotating tool axis stop command (D) is present before one or two or more feed axis positioning commands. In this case, the flow proceeds to step S7-8. For example, an example of a case in which there is one feed axis positioning command is illustrated in FIGS. 2A and 2B.

In step S7-8, the block information checking unit 108 sets information for executing the rotating tool axis stop operation together with the positioning operation as the analysis content of the feed axis positioning command (block). Specifically, in step S7-8, the block information modifying unit 110 rewrites the information in the block information storing unit 112 to the above content in response to an instruction from the block information checking unit 108 (or adds the content to the information). In this way, as described with reference to FIG. 2B, the rotating tool axis stop operation can be executed simultaneously with the operation of the feed axis positioning command. When a plurality of feed axis positioning commands are present, the rotating tool axis stop operation is executed during the operation of the first feed axis positioning command.

In step S7-9, it is set such that the rotating tool axis stop command (D) found in step S7-5 is not executed. That is the block information modifying unit 110 deletes the analysis content of the rotating tool axis stop command (D) (step S7-5) included in the original program command from the block information storing unit 112 (A) in response to an instruction from the block information checking unit 108. The operations of steps S7-8 and S7-9 are based on Solving Principle 2, and the application state is illustrated in FIGS. 2A and 2B.

In step S7-10, the same process as that of step S5-5S is executed. That is, information that the rotating tool axis orientation is executed together with a positioning operation is set as the analysis content of a block of present interest (that is, a block immediately before a tool replacement command i.e. the feed axis positioning command block which is a present analysis target). Specifically, in step S7-10, the block information modifying unit 110 rewrites the information in the block information storing unit 112 to the content in response to an instruction from the block information checking unit (or adds the content to the information).

Figure 1:
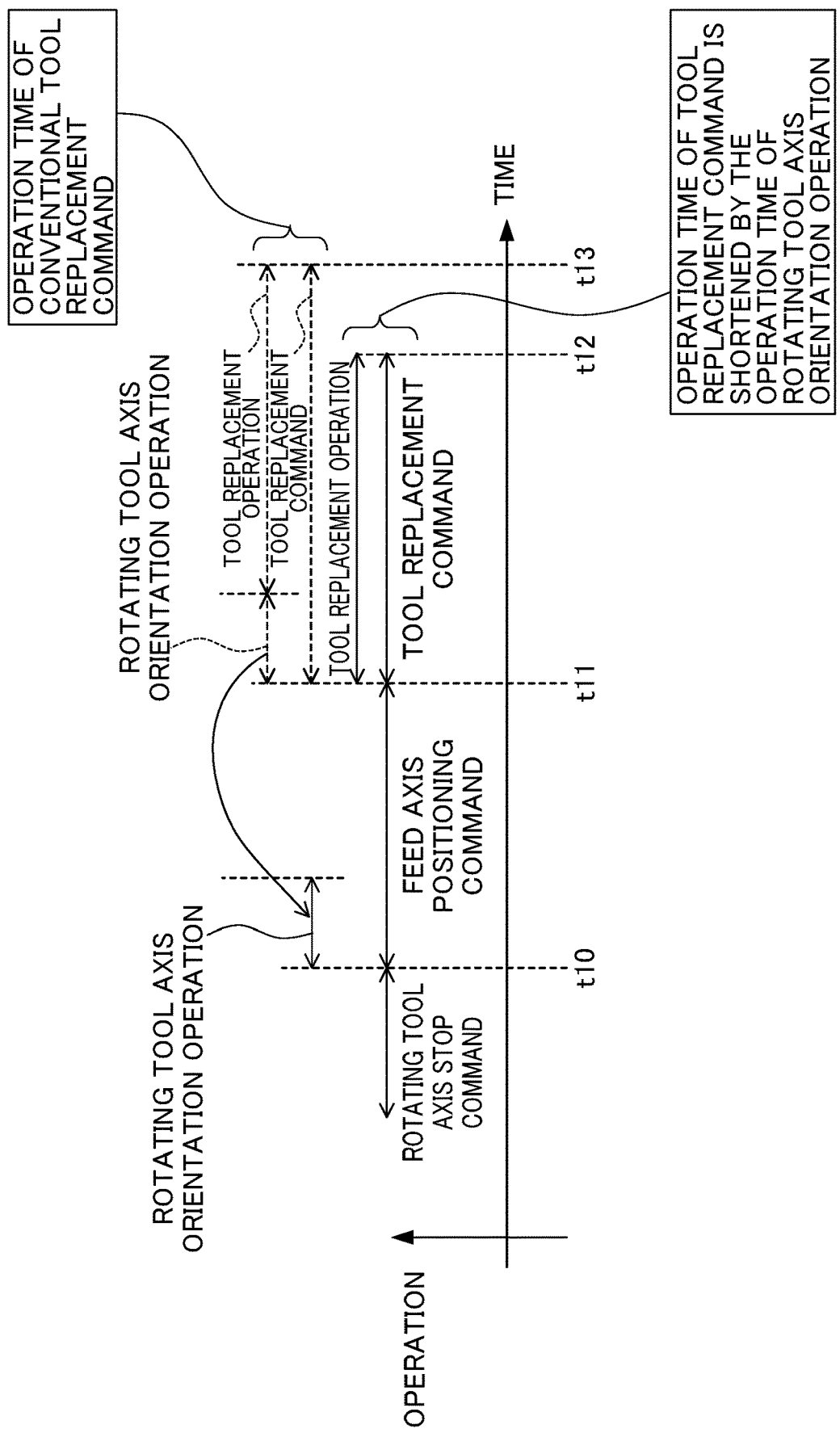
FIG. 1 is a timing chart illustrating operations of Solving Principle 1 or the present invention.

Furthermore, in step S7-10, a content that the rotating tool axis orientation operation is not to be executed is set as the analysis content of a block of present interest (that is, the tool replacement command block which is a present analysis target). Specifically, in step S7-10, the block information modifying unit 110 removes the rotating tool axis orientation operation from the analysis information (in the block information storing unit 112) of the tool replacement command block which is a block of present interest in response to an instruction from the block information checking unit to rewrite the analysis information to a content that the tool replacement operation only is to be executed (or delete the information of the rotating tool axis orientation operation). The operation of step S7-10 is based on Solving Principle 1, and the application state is illustrated in FIG. 1.

By the above-described operations, it is possible to appropriately rewrite the analysis result of the command on the basis of a row of commands in a provided program. The program execution unit 114 outputs commands for respective operations to the machine tool on the basis of the rewritten analysis content. As a result, since the program analysis unit 104 rearranges the analysis on the basis of a row of commands without modifying the provided existing program itself, it is possible to modify operations based on Solving Principles 1 and 2. Therefore, even when both Solving Principles 1 and 2 are applied, it is possible to shorten the cycle time during tool replacement without modifying an existing program.

Embodiment 3-2 (Second Application Example of Solving Principle 1 and Solving Principle 2

A second operation example when both Solving Principle 1 of reducing the time of a rotating tool axis orientation operation and Solving Principle 2 of reducing the time of a rotating tool axis stop are applied will be described. In this second operation example, as illustrated in FIGS. 3A and 3B, an operation when a rotating tool axis stop command is not present before a feed axis positioning command will be mainly described. In Embodiment 3-2, as described above, a program provided from the outside is input to the program input unit 102 and is transmitted to the program analysis unit 104.

Subsequently, in the program analysis unit 104 of the numerical controller 100, the same processes as those of Embodiment 3-1 are performed up to step S7-5 (see FIG. 7). In step S7-5, it is determined that the previous block is not the rotating tool axis stop command. As a result, the flow proceeds to step S7-6. Hereinafter, the processes subsequent to step S7-6 will be described.

In step S7-6, the block information checking unit 108 sets information for executing the rotating tool axis stop operation together with the positioning operation as the analysis content of the feed axis positioning command (block). Specifically, in step S7-6, the block information modifying unit 110 rewrites the information in the block information storing unit 112 to the above content in response to an instruction from the block information checking unit 108 (or adds the content to the information). In this way, as described with reference to FIG. 3B, the rotating tool axis stop operation can be executed simultaneously with the operation of the feed axis positioning command. When one or two or more feed axis positioning commands are present, the rotating tool axis stop operation is executed during the operation of the first feed axis positioning command.

Furthermore, in step S7-6, a content that the rotating tool axis stop operation is not to be executed is set as the analysis content, of a block of present interest (that is, the tool replacement command block which is a present analysis target). Specifically, in step S7-6, the block information modifying unit 110 removes the rotating tool axis stop operation from the analysis information (in the block information storing unit 112) of the tool replacement command block which is a block of present interest in response to an instruction from the block information checking unit to rewrite the analysis information to a content that only the tool replacement operation is to be executed (or delete the information of the rotating tool axis stop operation). The operation of step S7-7 is a process based on Solving Principle 2, and the application state is illustrated in FIGS. 3A and 3B.

In step S7-7, the same process as that of step S5-5 is executed. That is, information that the rotating tool axis orientation is executed together with a positioning operation is set as the analysis content of a block of present interest (that is, a block immediately before a tool replacement command i.e. the feed axis positioning command block which is a present analysis target). Specifically, in step S7-7, the block information modifying unit 110 rewrites the information in the block information storing unit 112 to the above content in response to an instruction from the block information checking unit (or adds the content to the information).

Furthermore, in step S7-7, a content that the rotating tool axis orientation operation is not to be executed is set as the analysis content of a block of present interest (that is, the tool replacement command block which is a present analysis target). Specifically, in step S7-7, the block information modifying unit 110 removes the rotating tool axis orientation operation from the analysis information (in the block information storing unit 112) of the tool replacement command block which is a block of present interest in response to an instruction from the block information checking unit to rewrite the analysis information to a content that only the tool replacement operation is to be executed (or delete the information of the rotating tool axis orientation operation). The operation of step S7-7 is based on Solving Principle 1, and the application state is illustrated in FIG. 1.

By the above-described operations, it is possible to appropriately rewrite the analyzed execution content of the command on the basis of a row of commands in a provided program. The program execution unit 114 outputs commands for respective operations to the machine tool on the basis of the rewritten analysis content. As a result, since the program analysis unit 104 rearranges the analysis on the basis of a row of commands without modifying the provided existing program itself, it is possible to modify operations based on Solving Principles 1 and 2. Therefore, even when both Solving Principles 1 and 2 are applied, it is possible to shorten the cycle time during tool replacement without modifying an existing program.

Advantages

As described above, the present embodiment provides the following advantages. Conventionally, since respective commands in a provided program are sequentially executed in that order, the cycle time increases. In contrast, according to the embodiments described above, since the operations of predetermined commands are executed simultaneously in parallel, it is possible to shorten the execution time of the rotating tool axis stop operation and the rotating tool axis orientation operation in particular.

Figure 14B:
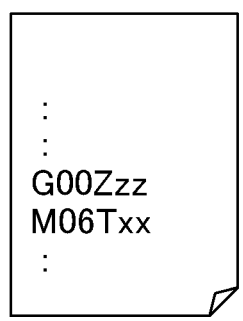
FIG. 14B is a diagram illustrating examples of general program commands when tool replacement is performed.
Figure 14C:
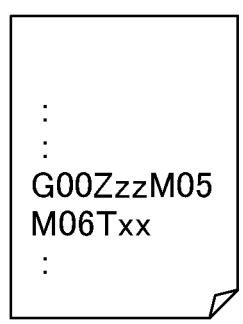
FIG. 14C is a diagram illustrating examples of general program commands when tool replacement is performed.
Figure 15A:
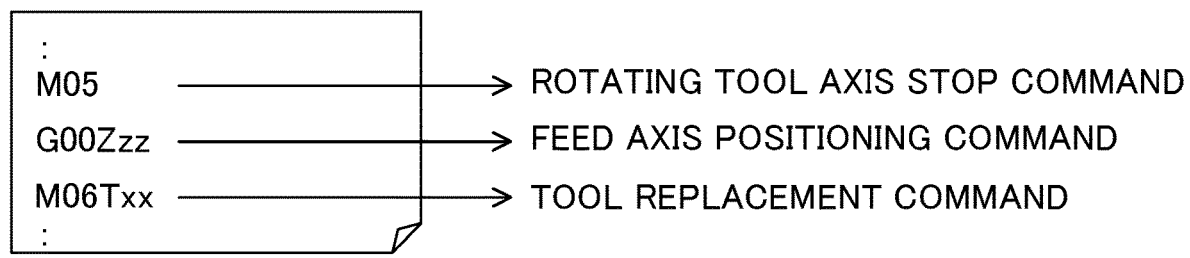
FIG. 15A is a conceptual diagram illustrating the meaning of respective commands of the example of the program illustrated in FIG. 14A.
Figure 15B:
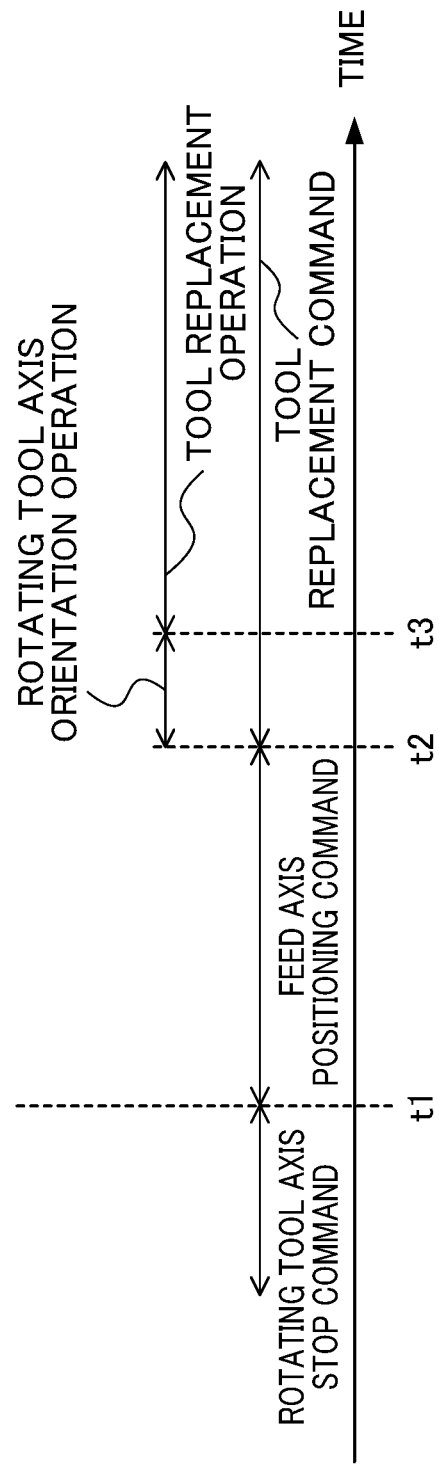
FIG. 15B is a timing chart illustrating execution timings of respective commands of the example of the program illustrated in FIG. 14A.
Figure 16A:
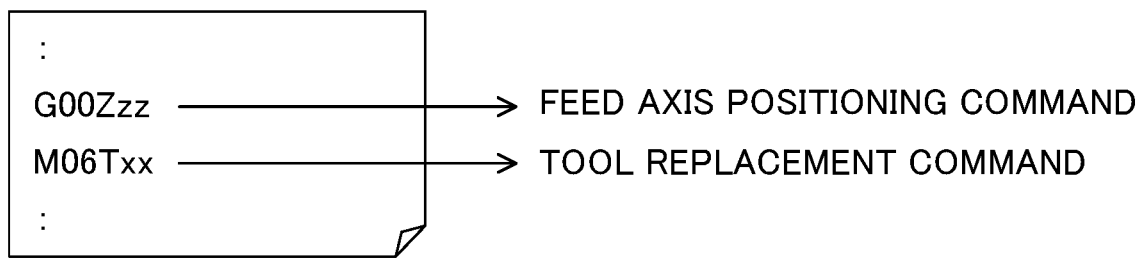
FIG. 16A is a conceptual diagram illustrating the meaning of respective commands of the example of the program illustrated in FIG. 14B.
Figure 17A:
FIG. 17A is a conceptual diagram illustrating the meaning of respective commands of the example of the program illustrated in FIG. 14C.
Figure 17B:
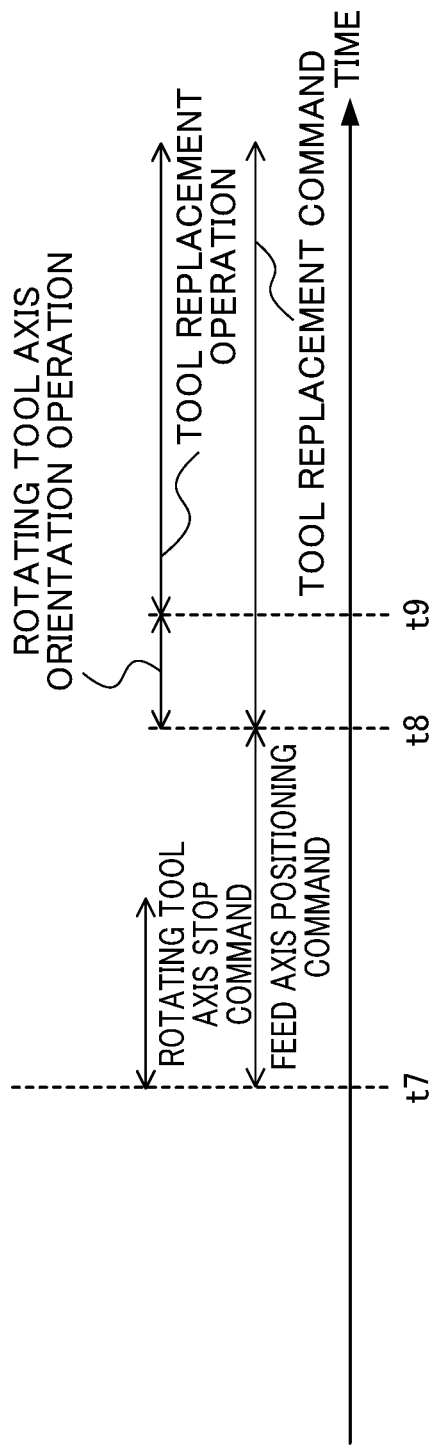
FIG. 17B is a timing chart illustrating execution timings of respective commands of the example of the program illustrated in FIG. 14C.

Conventionally, in the case of the program described with reference to FIG. 14B (FIG. 16A or FIG. 16B), since the rotating tool axis rotation stop operation is always performed before execution of the rotating tool axis or operation which is executed at the start of the tool replacement command, the execution time for the rotation stop is necessary. In contrast, according to the present embodiment, by the control of CNC (computer numerical control), since the rotating tool axis stop is performed simultaneously with the positioning operation prior to the tool replacement command, it is possible to shorten the time required for the rotation stop. When the program illustrated in FIG. 14A or FIG. 14B is modified so that M05 (the rotating tool axis stop command) or the rotating tool axis orientation is issued at the same time as the positioning command like the program illustrated in FIG. 14C, the cycle time required for the tool replacement may be shortened. However, existing programs need to be modified and such modification requires troublesome operations. Moreover, there is a possibility that modification errors may occur during modification of programs. In contrast, according to the present embodiment, it is possible to shorten the execution time for the rotating tool axis stop operation and the rotating tool axis orientation operation without modifying the program.

Modification 1

In the advantages described above, there may be a case in Which the execution time of the feed axis positioning command is shorter than the execution time of the rotating tool axis stop command and/or the rotating tool axis orientation operation. In such a case, similarly to the above-described embodiment, it is naturally possible to shorten the execution time by the amount corresponding to the execution time of a command having the shorter execution time. For example, FIG. 1 illustrates an example in which the execution time of the rotating tool axis orientation operation is shorter than the execution time of the feed axis positioning command. However, when the execution time of the feed axis positioning command is shorter than the execution time of the rotating tool axis orientation operation, the operation time of the feed axis positioning command can be shortened substantially by executing both the feed axis positioning command operation and the rotating tool axis orientation operation. That is, by executing both operations simultaneously, the execution time thereof is adjusted to the longer operation time. As a result, it is possible to substantially eliminate the operation having the shorter execution time (as compared to a case of executing the operations solely and sequentially). Moreover, for example, FIG. 2B illustrates an example in which the execution time of the rotating tool axis stop operation is shorter than the execution time of the feed axis positioning command. However, even when the execution time of the feed axis positioning command is shorter than the execution time of the rotating tool axis stop operation, by executing both the feed axis positioning command operation and the rotating tool axis stop operation, it is possible to substantially shorten the operation time of the feed axis positioning command. In this case, by executing both operations simultaneously, it is possible to adjust the execution time to the longer operation time and to substantially eliminate the operation having the shorter execution time.

Modification 2

The process of Solving Principle 1 or 2 described in the present embodiment and the process of the conventional operation may be switched. This switching can be performed by setting parameters or according to a program command or a signal command.

Modification 3-1

Figure 8A:
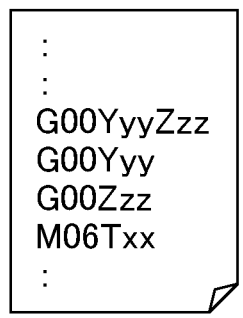
FIG. 8A illustrates an example of a program related to description of operations of another embodiment of the present invention.
Figure 8B:
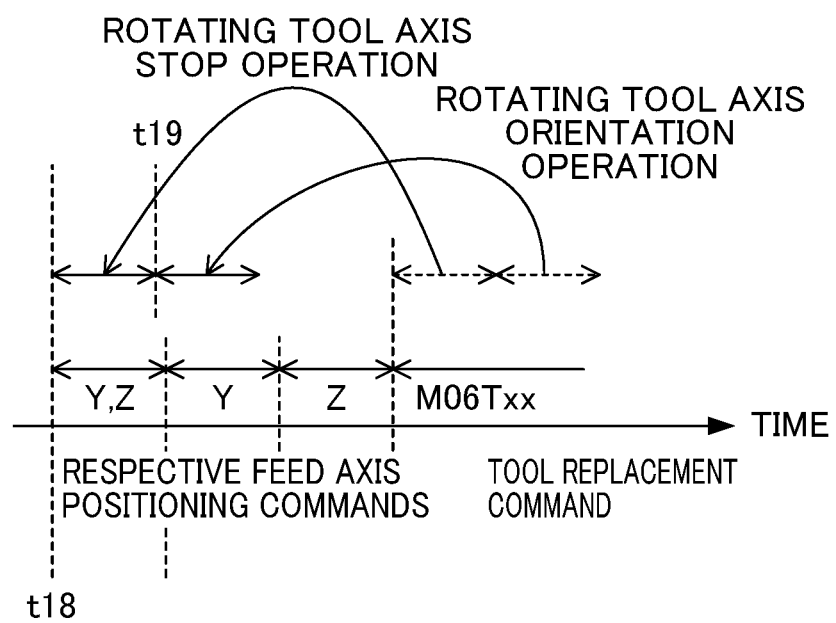
FIG. 8B is a timing chart illustrating operations of another embodiment of the present invention.

Like the program illustrated in FIG. 8A, there may be a program having successive feed axis positioning commands. In such a case, the rotating tool axis stop operation and/or the rotating tool axis orientation operation may be executed at the starting timing of the first feed axis positioning command of the successive feed axis positioning commands. That is, as illustrated in FIG. 8B, the rotating tool axis stop operation starts at the starting time point t18 of the first feed axis positioning command (Y,Z). After that, when the rotating tool axis stop operation ends at time point t19, the rotating tool axis orientation operation starts at time point t19.

Modification 3-2

Figures 9A, 9B:
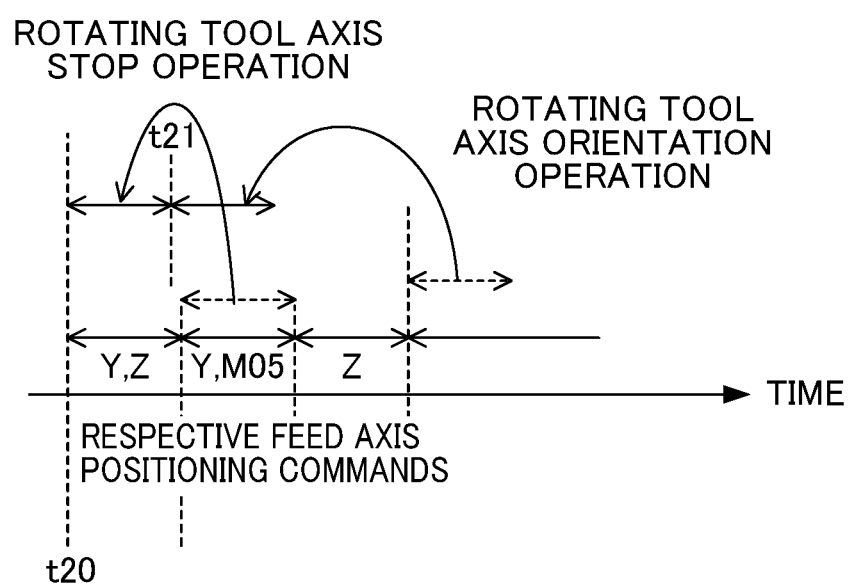
FIG. 9A illustrates an example of a program related to description of operations of another embodiment of the present invention.
FIG. 9B is a timing chart illustrating operations of another embodiment of the present invention.
Figure 10:
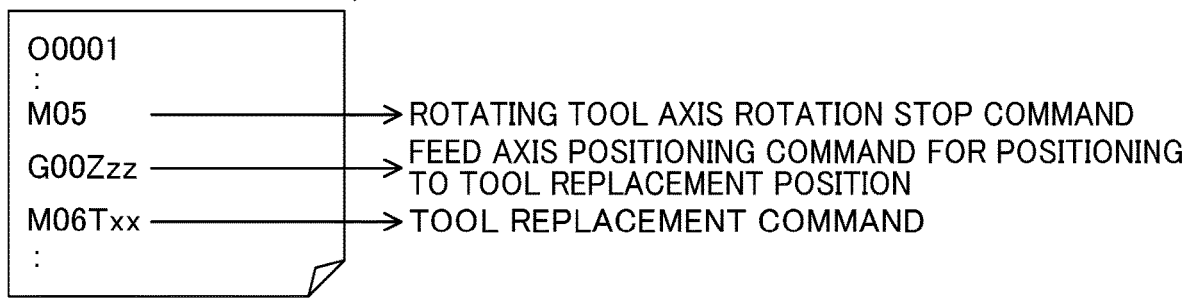
FIG. 10 is a diagram illustrating examples of commands of a machining program for performing tool replacement.
Figure 11:
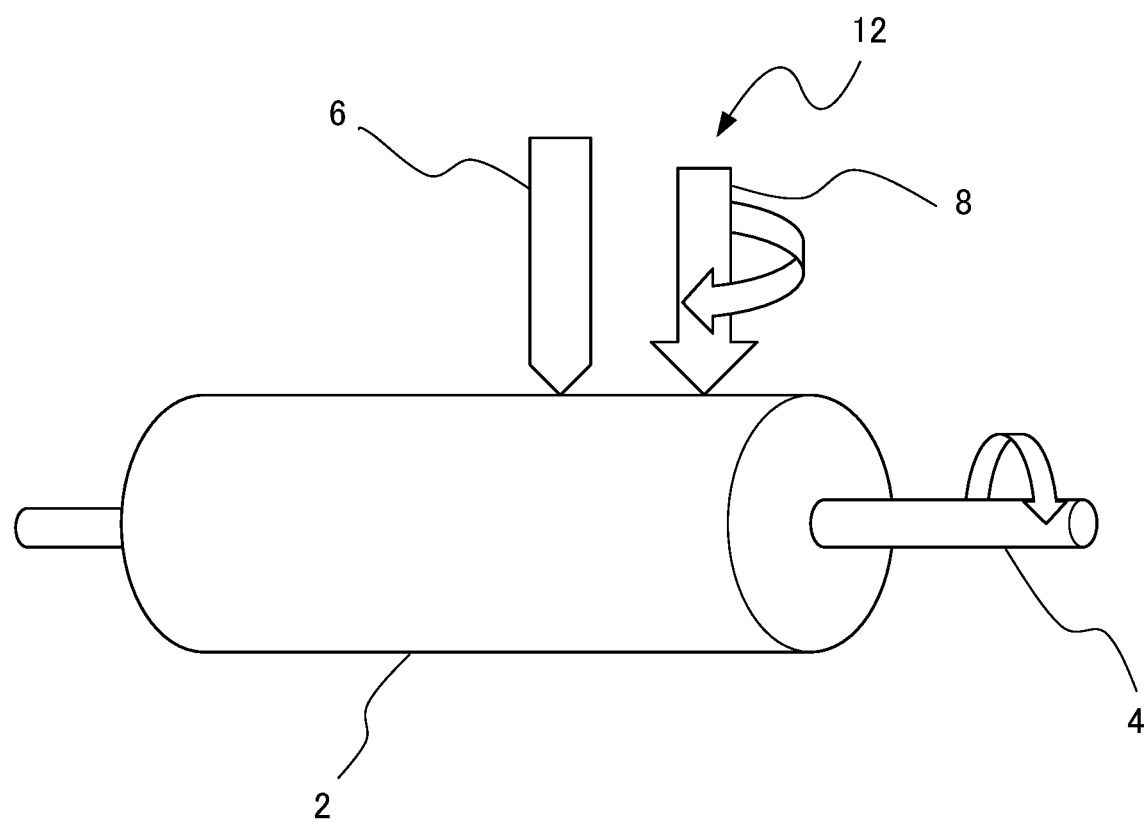
FIG. 11 is a diagram illustrating how machining is performed in such a combined lathe machine tool that includes a rotating tool axis separately from a main spindle.
Figure 12A:
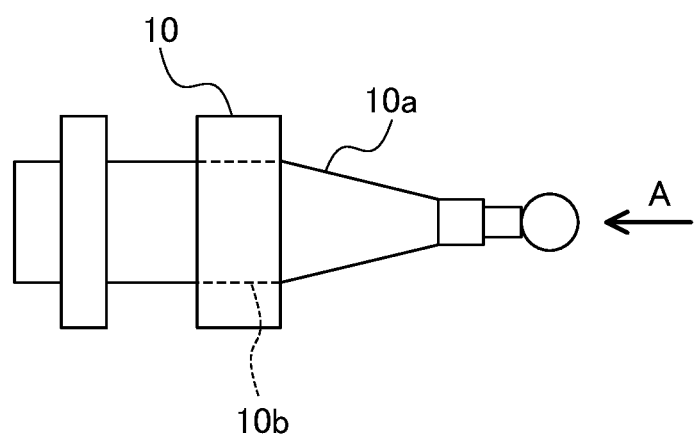
FIG. 12A is an explanatory diagram of a holding tool (a tooling) of a rotating tool.
Figure 12B:
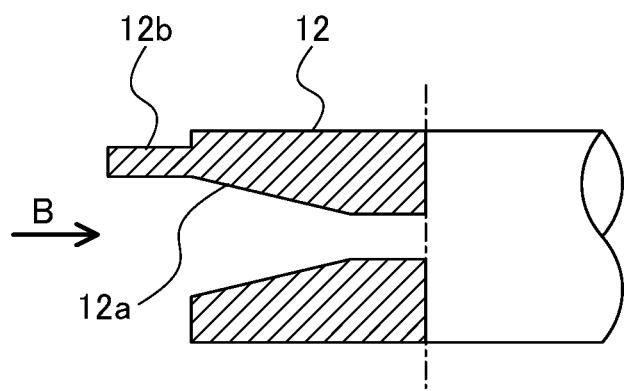
FIG. 12B is an explanatory diagram of a rotating tool axis.
Figure 12C:
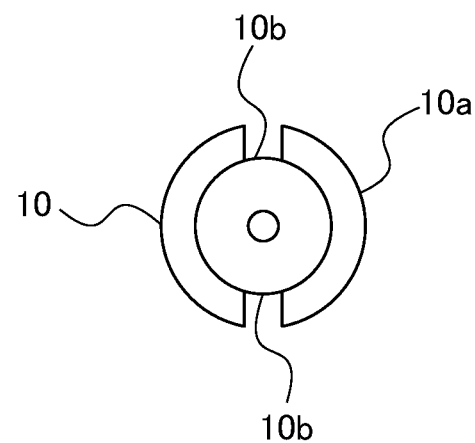
FIG. 12C is a view when a tooling is seen from a direction A parallel to an axis thereof.
Figure 12D:
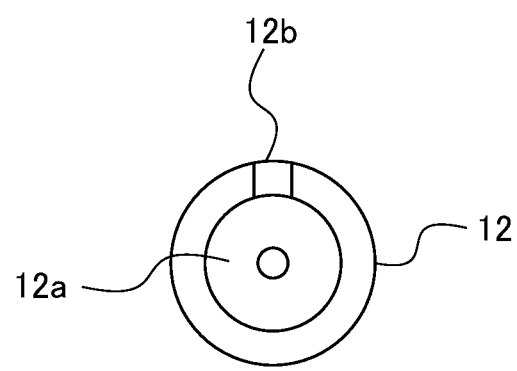
FIG. 12D is a view when a rotating tool axis is seen from a direction B parallel to an axis thereof.
Figure 13:
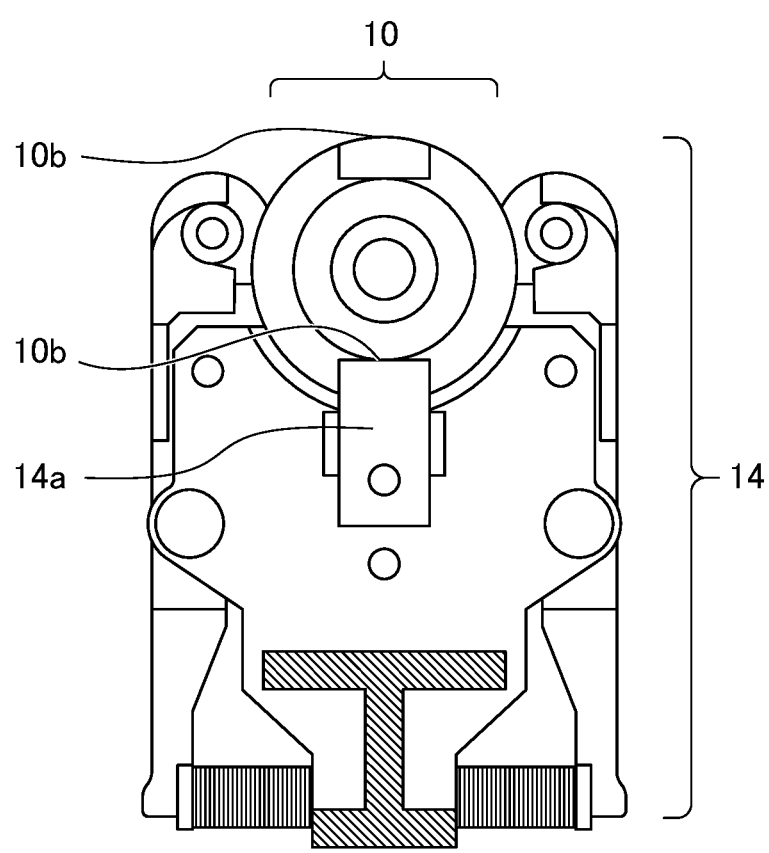
FIG. 13 is a diagram illustrating a grip during tool replacement.

Like the program illustrated in FIG. 9A, there may be a program in which a rotating tool axis stop command is present in the same block as any one of successive feed axis positioning commands. In the example of FIG. 9A, the rotating tool axis stop command M05 and a feed axis positioning command G00Yyy are present together. In such a case, the rotating tool axis stop operation in the middle of the successive feed axis positioning commands and/or the rotating tool axis orientation operation in the tool replacement command may be executed at the starting timing of the first feed axis positioning command of the successive feed axis positioning commands. That is, as illustrated in FIG. 9B, the rotating tool axis stop operation present in the middle of the successive feed axis positioning commands starts at the starting time point t20 of the first feed axis positioning command (Y,Z). After that, when the rotating tool axis stop operation ends at time point t21, the rotating tool axis orientation operation starts at time point t21. When the rotating tool axis stop command is present in the "first" command block of the plurality of successive feed axis positioning commands, the operating timing is not changed particularly. On the other hand, when the rotating tool axis stop command as present in a command block other than the "first" command block of the plurality of successive feed axis positioning commands, as described above, the rotating tool axis stop operation may be executed at the starting timing of the first feed axis positioning command.

Modification 3-3

In the embodiments and Modifications 3-1 and 3-2 described above, when successive feed axis positioning commands are present, the rotating tool axis stop operation and/or the rotating tool axis orientation operation is executed in the first feed axis positioning command. However, the operation may not necessarily be executed at the execution timing of the "first" feed axis positioning command. The rotating tool axis stop operation and/or the rotating tool axis orientation operation may be executed at the execution timing of any one of the plurality of feed axis positioning commands in such a case, it is also possible to execute the rotating tool axis stop operation and/or the rotating tool axis orientation operation in parallel with the feed axis positioning operation and to shorten the cycle time. When the rotating tool axis stop operation and the rotating tool axis orientation operation are executed in parallel with the feed axis positioning operation, the rotating tool axis orientation operation may be executed after the rotating tool axis stop operation is executed.

Comparison with Patent Document

Patent Document 1 discloses a technology in which it is determined whether a main spindle has arrived at a predetermined position and an orientation has been completed, and a rotating tool axis stop and an orientation are performed when the orientation has not been completed. In contrast, according to the present embodiment, it is determined whether a tool replacement command is present during analysis of a program. When the tool replacement command is found, the rotating tool axis stop command and/or the orientation is executed at the timing of the first positioning command when (one or two or more) positioning commands before the tool replacement command are executed. Due to this, unlike the technology disclosed in Patent Document 1, it is not necessary to determine whether the main spindle has arrived at a predetermined position.

Particularly, in Patent Document 1, when the rotating tool axis stop command is present before a movement command to move the main spindle to a predetermined position, it is not possible to perform the rotating tool axis stop and the positioning operation at the same time. On the other hand, in the present embodiment, even when a rotating tool axis stop command is present, since commands are created during analysis of a program such that the rotating tool axis stop command can be executed simultaneously with the positioning command, it is possible to execute these processes at the same time. In Patent Document 1, there is no description of a program command, and such a control that the block information is modified to execute a program such that the unnecessary rotating tool axis stop command block is not executed as described in the present embodiment is not disclosed.

For example, the program illustrated in FIG. 14A is a conventionally typical program used during tool replacement. When a moving distance of a feed axis positioning command (G00Zzz) is long, since it is not necessary to continuously rotate the rotating tool axis from the viewpoint of power saving, execution of the rotating tool axis stop command (M05) is often performed before (G00Zzz) like the program example illustrated in FIG. 14A. In such a case, according to Patent Document 1, (M05) and (G00Zzz) cannot be executed simultaneously, but (G00Zzz) is executed after (M05) is executed. In contrast, according to the present embodiment, as described in the flowchart of FIG. 6 and Embodiment 2-1, the block information is modified so that (G00Zzz) and (M05) are executed simultaneously immediately after (M05), and the block information of (M05) is deleted. In this way, even when the program is not edited, (M05) and (G00Zzz) can be executed simultaneously without executing the single block of (M05), and the cycle time can be shortened. Due to this, in the program example illustrated in FIG. 14A which is generally and often used, according to the present embodiment, it is possible to shorten the cycle time unlike Patent Document 1. As described above, the present embodiment is remarkably different from Patent Document 1, and the technology disclosed in the present embodiment could not be easily conceived from the technology disclosed in Patent Document 1.

While embodiments of the present invention have been described in detail, the above-described embodiments are specific examples of carrying out the present invention. The technical scope of the present invention is not limited to the above-described embodiments. Various changes can be made in the present invention without departing from the spirit thereof, and these changes also fall within the technical scope of the present invention.

EXPLANATION OF REFERENCE NUMERALS

2: Work
4: Main spindle
6: turning tool
8: Rotating tool
10: Tooling
10a: Tapered portion
10b: Key groove
12: Rotating tool axis
12a: Tapered portion
12b: Key
14: Grip
14a: Key
100: Numerical controller
102: Program input unit
104: Program analysis unit
106: Block analysis unit
108: Block information checking unit
110: Block information modifying unit
112: Block information storing unit
114: Program execution unit

What is claimed is:

1. A numerical controller comprising:
a program input unit that inputs a program that describes operations of a machine tool;
a program analysis unit that analyzes the input program and outputs an analysis result; and
a program execution unit that controls the machine tool on the basis of the analysis result obtained by the program analysis unit,
the program analysis unit including:
a block analysis unit that analyzes blocks of commands in the program to obtain an analysis result and stores the analysis result in a block information storing unit;
the block information storing unit that stores the analysis result;
a block information checking unit that checks the analysis result obtained by the block analysis unit and instructs a block information modifying unit to modify the analysis result for the command block when a predetermined condition is satisfied; and
the block information modifying unit that modifies the analysis result stored in the block information storing unit on the basis of the instruction of the block information checking unit, wherein
when it is determined that one or more feed axis positioning commands are present before a tool replacement command found in the analysis result,
the block information checking unit instructs the block information modifying unit to modify the analysis result stored in the block information storing unit so that a rotating tool axis orientation operation in the found tool replacement command is executed during execution of the feed axis positioning command in any one of the one or more feed axis positioning command blocks, in both situations of an execution time of the rotating tool axis orientation operation in the found tool replacement command being longer and being shorter than an execution time of the one or more feed axis positioning commands.

2. The numerical controller according to claim 1, wherein when it is determined that one or more feed axis positioning commands are present before the tool replacement command found in the analysis result, the block information checking unit instructs the block information modifying unit to remove a rotating tool axis orientation operation in the found tool replacement command from operations in the tool replacement command.

3. The numerical controller according to claim 1, wherein when it is determined that one or more feed axis positioning commands are present before a tool replacement command found in the analysis result, and a rotating tool axis stop command is present before the one or more feed axis positioning commands, the block information checking unit instructs the block information modifying unit to modify the analysis result stored in the block information storing unit so that the rotating tool axis stop command operation is executed during execution of the feed axis positioning command in any one of the one or more feed axis positioning command blocks, and the block information checking unit instructs the block information modifying unit to modify the analysis result stored in the block information storing unit so that the rotating tool axis orientation operation is executed subsequently to the rotating tool axis stop command operation.

4. The numerical controller according to claim 1, wherein when it is determined that one or more feed axis positioning commands are present before a tool replacement command found in the analysis result, and a rotating tool axis stop command is not present before the one or more feed axis positioning commands, the block information checking unit instructs the block information modifying unit to modify the analysis result stored in the block information storing unit so that a rotating tool axis stop operation in the tool replacement command is executed during execution of the feed axis positioning command in any one of the one or more feed axis positioning command blocks, and the block information checking unit instructs the block information modifying unit to modify the analysis result stored in the block information storing unit so that the rotating tool axis orientation operation is executed subsequently to the rotating tool axis stop operation.

5. A machine tool system comprising:
the numerical controller according to claim 1; and
the machine tool controlled by the numerical controller.

6. A numerical controller comprising:
a program input unit that inputs a program that describes operations of a machine tool;
a program analysis unit that analyzes the input program and outputs an analysis result; and
a program execution unit that controls the machine tool on the basis of the analysis result obtained by the program analysis unit,
the program analysis unit including:

a block analysis unit that analyzes blocks of commands in the program to obtain an analysis result and stores the analysis result in a block information storing unit;
the block information storing unit that stores the analysis result;
a block information checking unit that checks the analysis result obtained by the block analysis unit and instructs a block information modifying unit to modify the analysis result for the command block when a predetermined condition is satisfied; and
the block information modifying unit that modifies the analysis result stored in the block information storing unit on the basis of the instruction of the block information checking unit, wherein
when it is determined that one or more feed axis positioning commands are present before a tool replacement command found in the analysis result, and a rotating tool axis stop command is present before the one or more feed axis positioning commands,
the block information checking unit instructs the block information modifying unit to modify the analysis result stored in the block information storing unit so that the rotating tool axis stop command operation is executed during execution of the feed axis positioning command in any one of the one or more feed axis positioning command blocks, in both situations of an execution time of the rotating tool axis stop command operation being longer and being shorter than an execution time of the one or more feed axis positioning commands.

7. The numerical controller according to claim 6, wherein when it is determined that one or more feed axis positioning commands are present before the tool replacement command found in the analysis result, and a rotating tool axis stop command is present before the one or more feed axis positioning commands, the block information checking unit instructs the block information modifying unit to remove the analysis result of the rotating tool axis stop command present before the one or more feed axis positioning commands from the block information storing unit.

8. A numerical controller comprising:
a program input unit that inputs a program that describes operations of a machine tool;
a program analysis unit that analyzes the input program and outputs an analysis result; and
a program execution unit that controls the machine tool on the basis of the analysis result obtained by the program analysis unit,
the program analysis unit including:
a block analysis unit that analyzes blocks of commands in the program to obtain an analysis result and stores the analysis result in a block information storing unit;
the block information storing unit that stores the analysis result;
a block information checking unit that checks the analysis result obtained by the block analysis unit and instructs a block information modifying unit to modify the analysis result for the command block when a predetermined condition is satisfied; and
the block information modifying unit that modifies the analysis result stored in the block information storing unit on the basis of the instruction of the block information checking unit, wherein
when it is determined that one or more feed axis positioning commands are present before a tool replacement command found in the analysis result, and a rotating tool axis stop command for the tool replacement command is not present before the one or more feed axis positioning commands, the block information checking unit instructs the block information modifying unit to modify the analysis result stored in the block information storing unit so that a rotating tool axis stop operation included in the tool replacement command is executed during execution of the feed axis positioning command in any one of the one or more feed axis positioning command blocks, in both situations of an execution time of the rotating tool axis stop operation included in the tool replacement command being longer and being shorter than an execution time of the one or more feed axis positioning commands.

9. A numerical controller comprising:

a program input unit that inputs a program that describes operations of a machine tool;

a program analysis unit that analyzes the input program and outputs an analysis result; and a program execution unit that controls the machine tool on the basis of the analysis result obtained by the program analysis unit, the program analysis unit including:

a block analysis unit that analyzes blocks of commands in the program to obtain an analysis result and stores the analysis result in a block information storing unit;

the block information storing unit that stores the analysis result;

a block information checking unit that checks the analysis result obtained by the block analysis unit and instructs a block information modifying unit to modify the analysis result for the command block when a predetermined condition is satisfied; and the block information modifying unit that modifies the analysis result stored in the block information storing unit on the basis of the instruction of the block information checking unit, wherein when it is determined that two or more feed axis positioning commands are present before a tool replacement command found in the analysis result, and a rotating tool axis stop command is present in the same block as any one of the two or more feed axis positioning commands, the block information checking unit is configured to perform a first process of not outputting an instruction to modify the analysis result stored in the block information storing unit to the block information modifying unit in order to execute the rotating tool axis stop command operation in a block where the rotating tool axis stop command is present, or the block information checking unit is configured to perform a second process of instructing the block information modifying unit to modify the analysis result stored in the block information storing unit so that the rotating tool axis stop command operation is executed during execution of the other feed axis positioning command in the two or more feed axis positioning command blocks, in both situations of an execution time of the rotating tool axis stop operation being longer and being shorter than an execution time of the one or more feed axis positioning commands, wherein the first process is executed in a case in which the rotating tool axis stop command is present in a first command block of the two or more feed axis positioning commands, and the second process is executed in a case in which the rotating tool axis stop command is present in a command block other than the first command block of the two or more feed axis positioning commands.

10. The numerical controller according to claim 9, wherein when the block information checking unit executes the second process, the block information checking unit instructs the block information modifying unit to remove the analysis result of the rotating tool axis stop command from a block of the block information storing unit where the rotating tool axis stop command is present.

* * * * *